United States Patent
Kusuda et al.

(10) Patent No.: US 8,624,838 B2
(45) Date of Patent: Jan. 7, 2014

(54) ELECTRONIC APPARATUS

(75) Inventors: Hirohisa Kusuda, Tokyo (JP); Yasuhiro Nishide, Tokyo (JP); Daisuke Tsujino, Tokyo (JP); Jun Yamazaki, Tokyo (JP); Takashi Katayama, Tokyo (JP); Mineko Moroto, Tokyo (JP)

(73) Assignee: Vodafone Group PLC, Newbury, Berkshire (GB)

( * ) Notice: Subject to any disclaimer, the term of this patent is extended or adjusted under 35 U.S.C. 154(b) by 819 days.

(21) Appl. No.: 11/632,505

(22) PCT Filed: Jul. 4, 2005

(86) PCT No.: PCT/JP2005/012315
§ 371 (c)(1),
(2), (4) Date: Mar. 4, 2008

(87) PCT Pub. No.: WO2006/008946
PCT Pub. Date: Jan. 26, 2006

(65) Prior Publication Data
US 2008/0254821 A1    Oct. 16, 2008

(30) Foreign Application Priority Data
Jul. 15, 2004   (JP) .................................. 2004-208065

(51) Int. Cl.
G09G 5/00      (2006.01)
G09G 5/08      (2006.01)
G06F 3/033     (2013.01)

(52) U.S. Cl.
USPC .......................................... 345/158; 345/156

(58) Field of Classification Search
USPC ..................... 345/156–184; 178/18.01–20.04
See application file for complete search history.

(56) References Cited

U.S. PATENT DOCUMENTS

| | | | |
|---|---|---|---|
| 6,069,594 A * | 5/2000 | Barnes et al. | 345/7 |
| 6,313,827 B1 * | 11/2001 | Honjyou | 345/163 |
| 7,145,551 B1 * | 12/2006 | Bathiche et al. | 345/158 |
| 7,173,604 B2 * | 2/2007 | Marvit et al. | 345/156 |
| 7,180,500 B2 * | 2/2007 | Marvit et al. | 345/156 |
| 7,365,737 B2 * | 4/2008 | Marvit et al. | 345/156 |
| 2002/0140666 A1 * | 10/2002 | Bradski | 345/156 |
| 2003/0216176 A1 | 11/2003 | Shimizu et al. | |
| 2005/0212759 A1 * | 9/2005 | Marvit et al. | 345/156 |
| 2005/0212760 A1 * | 9/2005 | Marvit et al. | 345/156 |
| 2005/0212766 A1 * | 9/2005 | Reinhardt et al. | 345/157 |

(Continued)

FOREIGN PATENT DOCUMENTS

| | | |
|---|---|---|
| GB | 2347593 A | 9/2000 |
| JP | 07-064754 | 3/1995 |

(Continued)

*Primary Examiner* — Alexander Eisen
*Assistant Examiner* — Patrick F Marinelli
(74) *Attorney, Agent, or Firm* — Muirhead and Saturnelli, LLC

(57) ABSTRACT

An electronic apparatus includes key operation means, control means, detection means, storage means and memory means. The detection means detects motion of the electronic apparatus. The storage means stores motion identification data obtained from detection data on a motion after a predetermined key operation in the key operation means after predetermined guidance information is outputted or data obtained by computing the detection data, in the memory means. The control means executes the specific process according to the comparison results between detection data obtained by detecting a motion of the electronic apparatus after the motion identification data is stored or data obtained by computing the detection data, and the motion identification data.

20 Claims, 16 Drawing Sheets

(56) References Cited

U.S. PATENT DOCUMENTS

| | | | |
|---|---|---|---|
| 2005/0212767 A1* | 9/2005 | Marvit et al. | 345/158 |
| 2005/0216867 A1* | 9/2005 | Marvit et al. | 715/863 |
| 2007/0061301 A1 | 3/2007 | Ramer et al. | |
| 2007/0118533 A1 | 5/2007 | Ramer et al. | |
| 2007/0290998 A1* | 12/2007 | Choi et al. | 345/158 |
| 2008/0014987 A1* | 1/2008 | Kusuda et al. | 455/556.1 |
| 2010/0123660 A1* | 5/2010 | Park et al. | 345/157 |

FOREIGN PATENT DOCUMENTS

| | | |
|---|---|---|
| JP | 09-044297 | 2/1997 |
| JP | 2000-214988 | 8/2000 |
| JP | 2002-330210 | 11/2002 |
| JP | 2003-334379 | 11/2003 |
| WO | WO 0186920 A2 * | 11/2001 |
| WO | WO 02/41178 A1 | 5/2002 |
| WO | WO 2007/080413 A1 | 7/2007 |

* cited by examiner

ELECTRONIC APPARATUS

TECHNICAL FIELD

The present invention relates to an electronic apparatus such as a mobile communication terminal, a personal digital assistance (PDA), or a game machine, etc.

BACKGROUND ART

As such an electronic apparatus, there is known a small-sized information processing apparatus including attitude detection means for detecting an attitude as described in, for example, Patent Document 1. In this small-sized information processing apparatus, when a scroll start switch as key operation means is depressed, a tilt angle (tilt angle with respect to the gravity direction) of the display unit at this point in time is detected by a tilt sensor as detection means. After this detection, the tilt angle of the display unit is detected again by the tilt sensor, and from the tilt angle detected at this time, the tilt angle at the time of depressing (basic attitude data) is subtracted, thereby a relative tilt angle from the angle at the time of depressing is calculated. Then, based on this relative tilt angle, the screen of the display unit is scrolled. More specifically, by this relative tilt angle, the relative tilt direction of the display unit from the time of depressing is recognized, and a process for scrolling the display screen toward a direction corresponding to the tilt direction is performed. A process for lowering the scrolling speed of the display screen is also performed when this relative tilt angle is less than a predetermined angle (motion identification data), and increasing the scrolling speed of the display screen when the angle is not less than the predetermined angle.

There is also known a mobile terminal having acceleration detection means for detecting acceleration as described in Patent Document 2. This mobile terminal includes means for determining whether acceleration generated when a user shakes this terminal is not less than a predetermined threshold value (motion identification data). In this Patent Document 2, a detailed example is described in which the number of times when the acceleration becomes not less than the predetermined threshold value is counted and a process for calling a phone number corresponding to the count is performed. The threshold value is a value set for distinguishing acceleration generated when a user shakes this terminal from a vibration applied when the user does not shake the terminal, for example, when the user uses a means of transportation. In the Patent Document 2, as a method for setting this threshold value, it is described that when the "FCN" key and "5" key as key operation means are depressed, the mode shifts to a mode of threshold value detection, and a value obtained by adding a maximum value of acceleration detected by the acceleration detection means in 24 hours with a value of several to 50 percent of the maximum value is used as the threshold value. This maximum value of acceleration detected in 24 hours is a maximum value of acceleration generated when the user does not shake the terminal. Therefore, by using a value obtained by adding a value of several to 50 percent of the maximum value as the threshold value, the acceleration generated when a user shakes the terminal can be distinctively recognized from the acceleration generated when the user does not shake the terminal.

Patent Document 1: Japanese Unexamined Patent Application Publication No. H07-64754
Patent Document 2: Japanese Unexamined Patent Application Publication No. 2002-330210

In the small-sized information processing apparatus of the Patent Document 1, a handling method when the attitude of the entire apparatus is changed so as to tilt the display unit differs among users. Therefore, as the predetermined angle that becomes a threshold value for determining fast or slow scrolling speed of the display screen, the respective angles most suitable for the respective users are used. However, in this small-sized information processing apparatus, the predetermined angle is fixed in advance regardless of the users. Therefore, a user has trouble in operating the apparatus if the fixed angle is not suitable for him/her.

In addition, in this small-sized information processing apparatus, when the scroll start switch is depressed, a tilt angle of the display unit at this point in time is detected to acquire basic attitude data, and at the same time, a process for scrolling the display screen of the display unit is started. In such a case where the basic attitude data acquisition timing and the start timing of the process using this basic attitude data are concurrent with each other, it becomes impossible to separately start a process using the basic attitude data after the basic attitude data is acquired. Therefore, for a user who does not want to use the attitude of the display unit at the start time of the process as the basic attitude, the basic attitude of the process is not the same as his/her desired basic attitude. As a result, operability for the process is deteriorated.

In addition, in the mobile terminal of Patent Document 2, the magnitude of the acceleration generated when a user shakes the mobile terminal changes depending on the shaking manner and the shaking force. The shaking manner and force differ among users. Accordingly, the optimum threshold value for distinguishing the acceleration generated when a user shakes the mobile terminal and acceleration generated when the user does not shake the mobile terminal is different among users. Therefore, when the threshold value set according to the threshold value setting method described in Patent Document 2, etc., so as to enable distinction between the acceleration generated when a user shakes the mobile terminal and the acceleration generated when the user does not shake is not suitable for the user, operability for the user is low.

The description given above concerns an example in which a process for changing a scrolling speed of a display screen and a process for calling a phone number are performed when the mobile terminal is moved so as to change in attitude or generate acceleration, however, the problem is not limited to these processes.

Accordingly, it would be desirable to provide an electronic apparatus which can improve operability when a specific process is executed by moving the electronic apparatus by shaking or tilting it by a user.

SUMMARY OF THE INVENTION

The electronic apparatus relating to the present invention includes key operation means including keys to be operated by a user; detection means for detecting motions of the electronic apparatus; memory means for memorizing motion identification data for identifying motions of the electronic apparatus; guidance information output means for outputting guidance information for urging a predetermined key operation for the key operation means and urging an operation of the electronic apparatus for generating motion of the electronic apparatus corresponding to a specific process after the predetermined key operation; storage means for storing motion identification data obtained from detection data on the motion of the electronic apparatus detected by the detection means after the predetermined key operation after the guidance information is outputted from the guidance information output means or data obtained by computing the detection data, in the memory means; and control means for executing the predetermined process according to the comparison results between the detection data obtained by detecting motion of the electronic apparatus with the detection means after the motion identification data is stored or data obtained by computing the detection data, and the motion identification data.

First, in this electronic apparatus, guidance information is outputted for making a user perform a predetermined key operation, and operate the electronic apparatus to cause motion corresponding to the specific process after the key operation. When this motion is detected by the detection means, motion identification data obtained from the detection data or data obtained by computing the detection data (hereinafter, referred to as "detection data, etc." as appropriate) are stored in the memory means. This motion identification data is for identifying a motion of the electronic apparatus for performing the specific process. This motion identification data may be the detection data, etc., itself, or may be data for identifying a range of motion of the electronic apparatus obtained based on the detection data, etc. At an arbitrary timing after this storage, when the user moves the electronic apparatus and this motion is detected by the detection means, the detection data, etc., obtained by this detection and the motion identification data are compared with each other, and according to these comparison results, the specific process is executed.

Thereby, motion identification data obtained from the detection data, etc., on a motion suitable for a user is stored as motion identification data for identifying a motion for executing the specific process. Accordingly, a motion suitable for a user can be set as a motion for executing the specific process. Therefore, operability when the specific process is executed by shaking or tilting the electronic apparatus by a user can be improved.

In the electronic apparatus, preferably, the guidance information output means outputs various guidance information for a plurality of specific processes that the control means can execute; the storage means performs, for the plurality of specific processes, a process for storing the motion identification data obtained from detection data on a motion of the electronic apparatus detected by the detection means after the predetermined key operation after one piece of guidance information is outputted by the guidance information output means or data obtained by computing the detection data, as motion identification data corresponding to the specific process according to the one piece of guidance information, in the memory means; and the control means compares the detection data obtained by performing the motion detection with the detection means or data obtained by computing the detection data and a plurality of motion identification data memorized in the memory means, and executes the specific process corresponding to the motion identification data including the detection data or data obtained by computing the detection data.

In this electronic apparatus, by outputting various guidance information on a plurality of specific processes, a user is made to perform an operation of the electronic apparatus to cause motions corresponding to the respective specific processes after a predetermined key operation. The predetermined key operation for causing motions corresponding to the specific processes may be the same among the specific processes or may be different among the specific processes. The motions corresponding to the respective specific processes are detected by the detection means, and motion identification data obtained from the detection data, etc., are stored in the memory means as motion identification data corresponding to the respective specific processes. Then, when a user moves the electronic apparatus at an arbitrary timing after this storage, among the plurality of specific processes, the specific process corresponding to motion identification data including detection data, etc., relating to this motion is performed. Therefore, the plurality of specific processes can be selectively executed in response to a motion suitable for a user according to a motion difference.

In the electronic apparatus, as the detection means, acceleration detection means for detecting acceleration generated in this electronic apparatus is preferably used. In this electronic apparatus, a user shakes or moves the electronic apparatus to generate acceleration, thereby the electronic apparatus can be made to execute the specific process.

In the electronic apparatus, it is preferable that the acceleration detection means detects the magnitude and direction of the acceleration. In this electronic apparatus, according to the magnitude and direction of shaking the electronic apparatus or the speed and direction of moving the electronic apparatus by a user, the motions of the electronic apparatus can be detected in greater detail. Therefore, it becomes possible to prevent execution of the specific process by mistake when the user does not intend it. As a result, in order to make the electronic apparatus execute the specific process, the user is required to more accurately move the electronic apparatus, however, this motion is optimized for each user, so that the operability is not deteriorated.

In the above-described electronic apparatus, as the detection means, attitude change detection means for detecting an attitude change of the electronic apparatus is preferably used. In this electronic apparatus, a user tilts or rotates the electronic apparatus to change the attitude of the electronic apparatus, thereby the user can make the electronic apparatus execute the specific process.

In the electronic apparatus, as the attitude change detection means, rotation detection means for detecting a rotation angular displacement or a rotation angular velocity and a rotation direction generated in the electronic apparatus is preferably used. In this electronic apparatus, from a rotation angular displacement or rotation angular velocity and rotation direction generated when a user tilts or rotates the electronic apparatus, an attitude change of the electronic apparatus can be detected in greater detail. Therefore, this brings about an excellent effect of preventing erroneous execution of the specific process when a user does not intend it. As a result, in order to make the electronic apparatus execute the specific process, the user is required to more accurately move the electronic apparatus, however, such motion is optimized for each user, so that the operability is not deteriorated.

Another electronic apparatus of the present invention includes key operation means having keys to be operated by a user; detection means for detecting an attitude of the electronic apparatus; basic attitude data memory means for memorizing basic attitude data for identifying a basic attitude of the electronic apparatus; storage means for storing the basic attitude data obtained from detection data on an attitude of the electronic apparatus detected by the detection means at the time of key operation on a specific key of the key operation means or data obtained by computing the detection data, in the basic attitude data memory means; and control means for executing a specific process based on differences between detection data obtained by detecting an attitude of the electronic apparatus with the detection means after the basic attitude data are stored or data obtained by computing the detection data, and the basic attitude data.

In this electronic apparatus, when a user performs a key operation on a specific key, the attitude of the electronic apparatus at this time is detected by the detection means, and basic attitude data obtained from this detection data or data obtained by computing the detection data are stored in the basic attitude data memory means. Then, after this storage, based on differences between the detection data detected by the detection means or data obtained by computing the detection data and the basic attitude data stored in the basic attitude data memory means, the specific process is executed. Thus, according to this electronic apparatus, the specific process using basic attitude data can be performed after the basic attitude data are stored. Accordingly, a user can determine a basic attitude by operating a specific key independently from the attitude of the electronic apparatus at the start time of the specific process. Therefore, the operability of execution of the specific process by moving the electronic apparatus by shaking or moving it by a user can be improved.

The above-described "electronic apparatus" includes not only a mobile communication terminal but also a Personal Digital Assistance (PDA), a game machine, etc. The above-described "mobile communication terminal" includes a PDC (Personal Digital Cellular) type, a GSM (Global System for Mobile Communications) type and a TIA (Telecommunication Industry Association) type mobile phone, a mobile phone standardized by IMT (International Mobile Telecommunication)-2000, a TD-SCDMA (MC: Multi Carrier) type mobile phone that is one of the TD-SCDMA (Time Division Synchronous Code Division Multiple Access) type, a PHS (Personal Handyphone System), a car phone, etc. The "mobile communication terminal" also includes a mobile communication terminal added with a mobile phone module. The "electronic apparatus" also includes an electronic apparatus without communication functions.

Control in the electronic apparatus can also be realized by executing a predetermined program in a computer provided therein. The program to be used in this computer may be provided by using a recording medium such as an FD or CD-ROM storing the program as digital information, or may be provided by using a communication network such as a computer network.

According to the present invention, operability of execution of the specific process by moving an electronic apparatus by shaking or tilting it by a user can be improved.

DETAILED DESCRIPTION OF VARIOUS EMBODIMENTS

Hereinafter, an embodiment of the present invention will be described with reference to the drawings.

Figure 1:
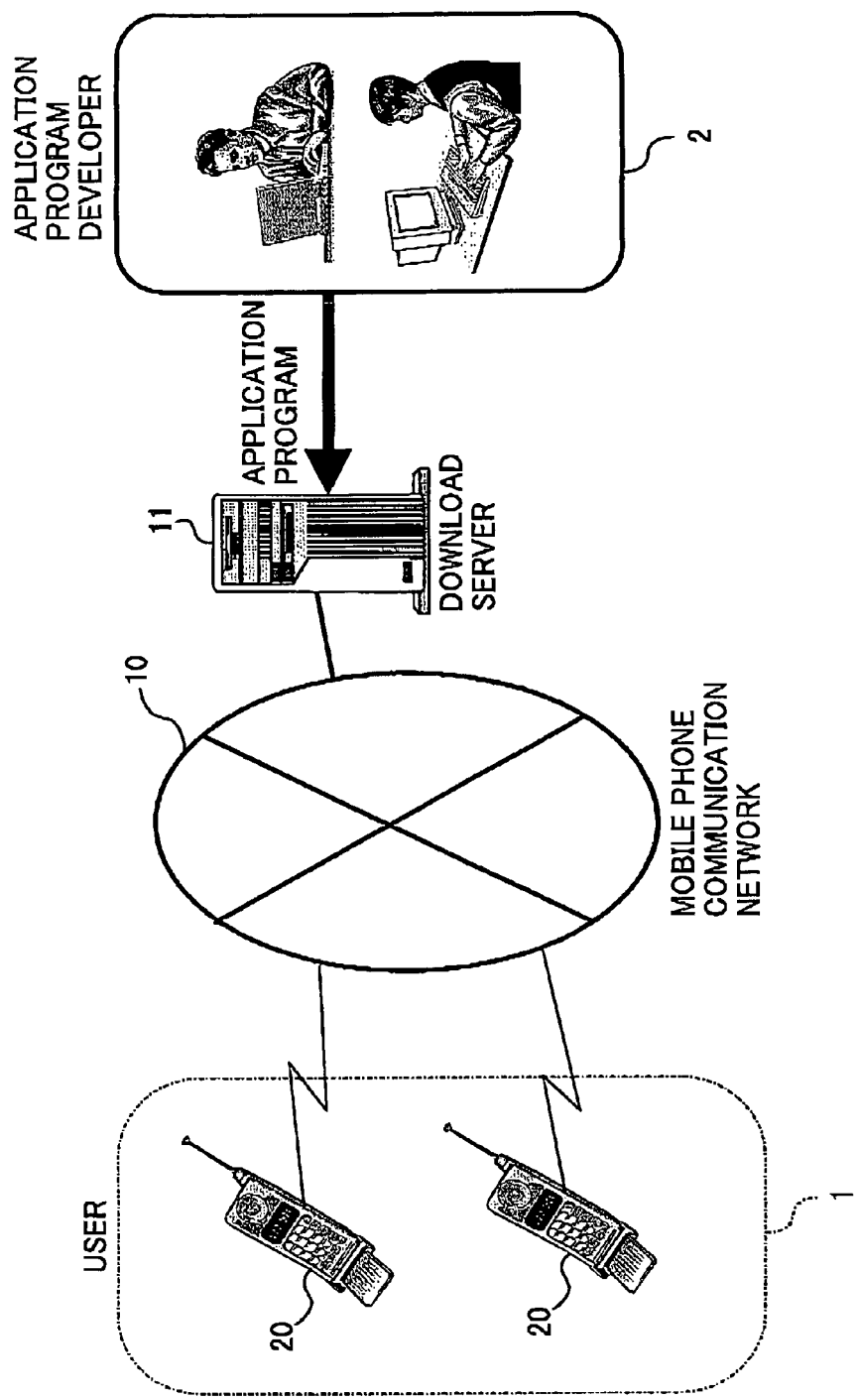
FIG. 1 is an explanatory view for describing an entire configuration of a mobile communication system that can be utilized by a mobile phone in an embodiment according to the present invention.

FIG. 1 is an explanatory view for describing an entire configuration of a mobile communication system that can be utilized by mobile phones according to the present embodiment.

In this mobile communication system, the mobile phone 20 that a user 1 uses has a configuration capable of executing an application program registered by the user 1. In the present embodiment, this application is developed according to object-oriented programming which does not depend on a platform. As such an application program, there are available application programs written in JAVA (registered trademark, the same applies to the description below), and application programs which work in an application execution environment of BREW (registered trademark, the same applies to the description below). This mobile phone 20 is connectable to a mobile phone network 10 as a communication network. To this mobile phone network 10, an application program download server (hereinafter, referred to as "download server") 11 as a program providing server is connected. When this download server 11 accepts a download request from the mobile phone 20, the download server 11 transmits an application program relating to this request to the mobile phone 20.

The application program provided from the download server 11 is provided from a developer 2 of the application program. More specifically, for example, from a personal computer, etc., on the application program developer 2 side, the application program is uploaded to the download server 11 via an exclusive line or public line and provided. It is also possible that a recording medium such as an optical disk or magnetic disk on which the developed application program has been recorded is delivered from the application program developer 2 to a communication carrier who manages and operates the download server 11 and the application program in the recording medium is read by the download server 11 and provided. The thus provided application program is registered on the download server 11 in a state that it can be downloaded into the mobile phone 20 via the mobile phone network 10.

Figure 2:
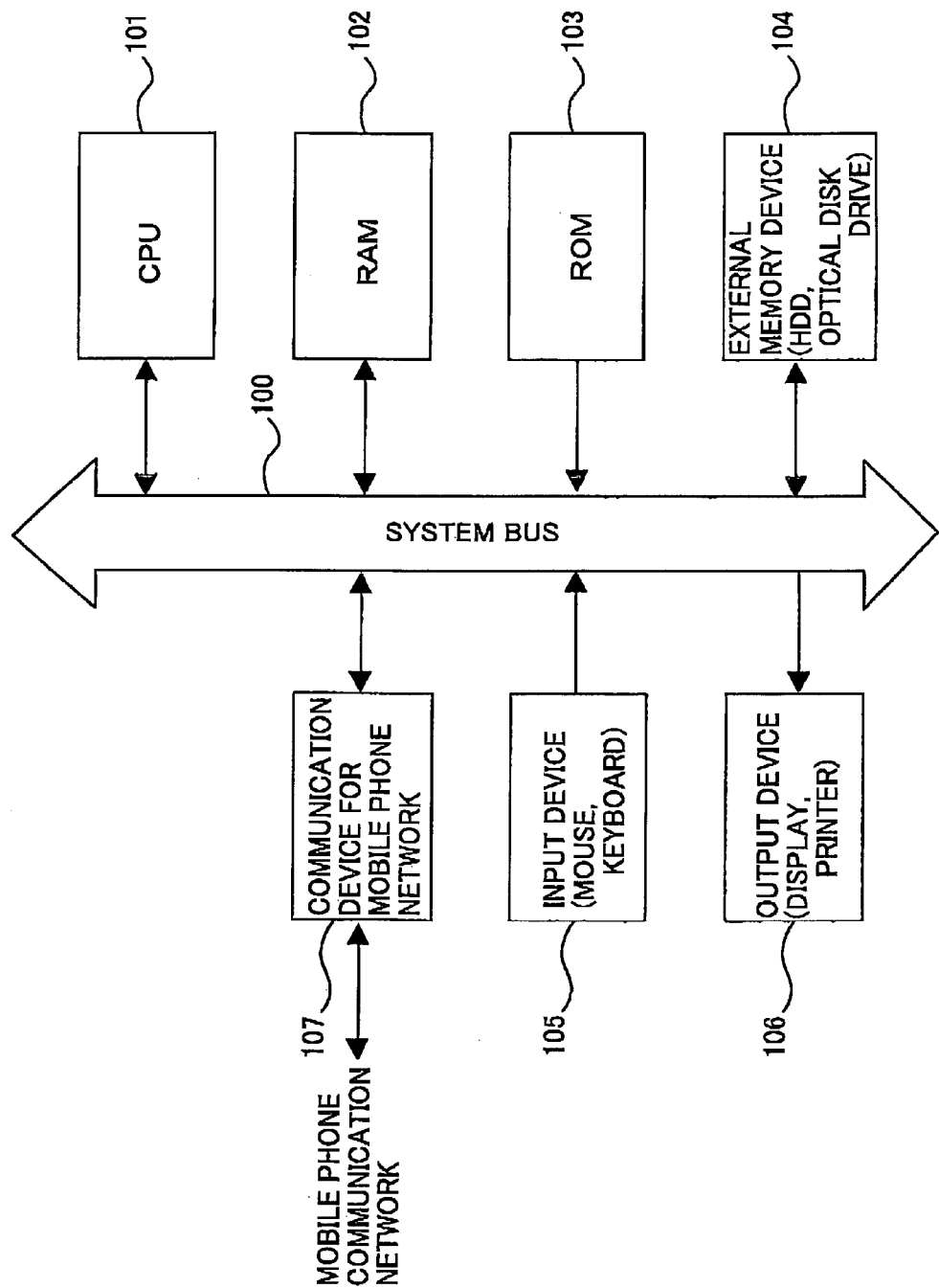
FIG. 2 is a schematic configuration diagram showing hardware configuration of a download server constituting the mobile communication system.

FIG. 2 is a schematic configuration diagram showing hardware configuration of the download server 11.

This download server 11 includes a system bus 100, a CPU 101, an internal memory device, an external memory device 104, an input device 105, and an output device 106. The internal memory device is comprised of a RAM 102 and a ROM 103, etc. The external memory device is comprised of a hard disk drive (HDD) or an optical disk drive, etc. The input device 105 is comprised of the external memory device 104, a mouse, and a keyboard, etc. The output device 106 includes a display and a printer, etc. Furthermore, this download server 11 includes a mobile phone communication device 107 for communicating with the mobile phones 20 of each user 1 via the mobile phone network 10.

Components such as the CPU 101 and the RAM 102 exchange data and program commands, etc., with each other via the system bus 100. A program for operating this download server 11 according to predetermined procedures is memorized in the ROM 103 or the external memory device 104, and it is called out to a work area on the CPU 101 and the RAM 102 and executed as appropriate. In this download server 11, the application program to be provided to the mobile phone 20 is memorized in the external memory device 104. The download server 11 has a function for transmitting the application program memorized in the external memory device 104 to the mobile phone 20 via the mobile phone communication network 10 by cooperation of the CPU 101, RAM 102, and communication device 107, etc., for a mobile phone communication network in response to a download request from the mobile phone 20. This download server 11 may be constructed as an exclusive control unit, or may be constructed by using a general-purpose computer system. It may be constructed by one computer, or may be constructed by connecting a plurality of computers having a plurality of functions, respectively, to each other by a network.

Figure 3:
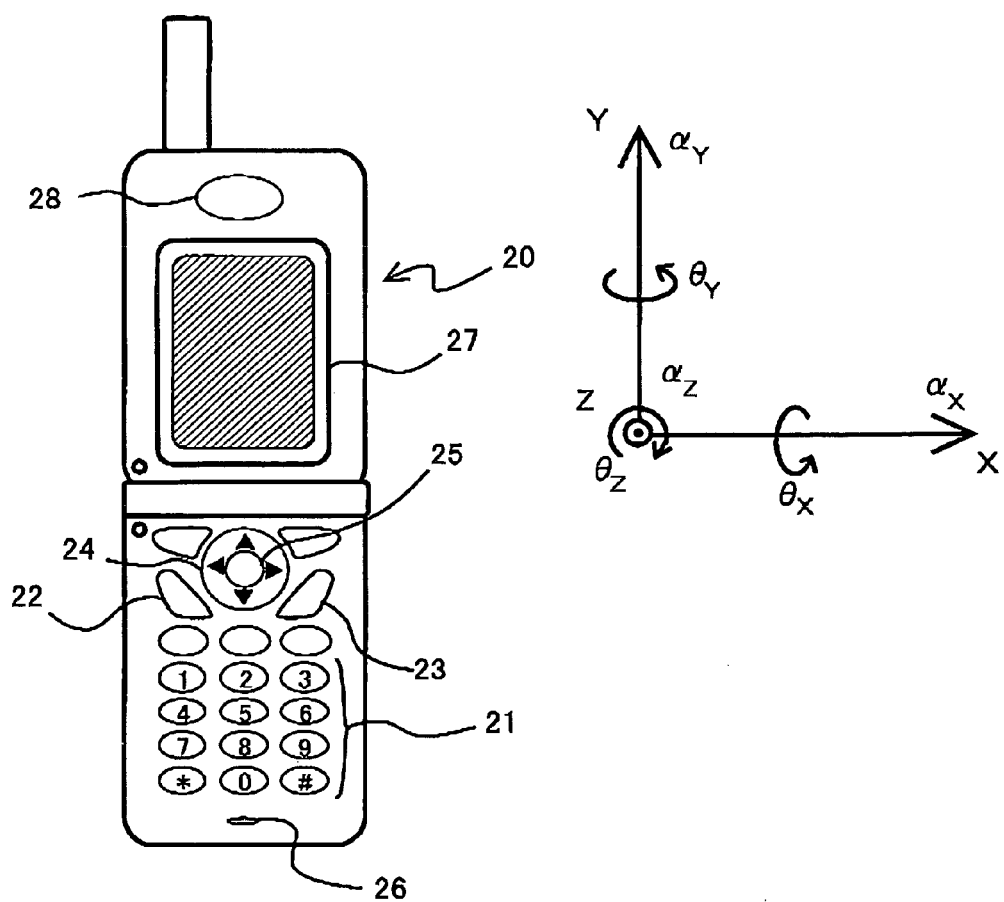
FIG. 3 is a front view showing an external appearance of the mobile phone.
Figure 4:
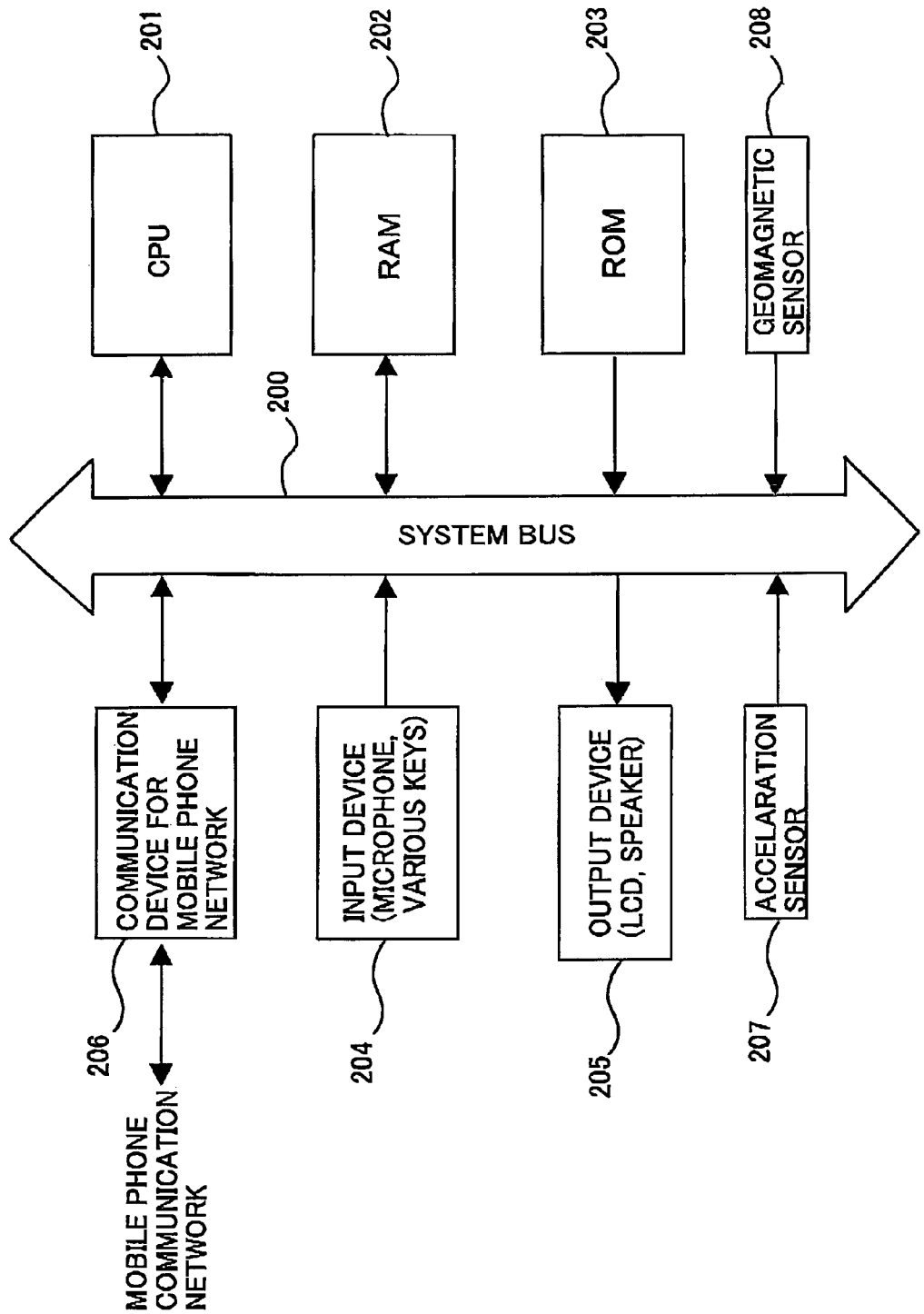
FIG. 4 is a schematic configuration diagram showing hardware configuration of the mobile phone.

FIG. 3 is a front view showing the external appearance of the mobile phone 20, and FIG. 4 is a schematic configuration diagram showing hardware configuration of the mobile phone 20.

This mobile phone 20 is a clam shell (folding) type mobile phone, and includes an internal control device including a system bus 200, a CPU 201, a RAM 202, and a ROM 203, etc., an input device 204, an output device 205, a mobile phone communication device 206, an acceleration sensor 207, and a geomagnetic sensor 208, etc. Components such as the CPU 201 and the RAM 202 exchange various data and program commands described later, etc., with each other via the system bus 200. The input device 204 is comprised of data input keys (numeric keypad, * key, # key) 21, a call start key 22, a call termination key 23, a scroll key 24, a multifunction key 25, and a microphone 26, etc. The output device 205 is comprised of a liquid crystal display (LCD) 27 as display means that is guidance information output means, and a speaker 28, etc. This guidance information output means including the liquid crystal display (LCD) 27, etc., outputs guidance information for urging the key operation means 220 to perform a predetermined key operation and urging an operation of the mobile phone 20 to cause a motion of the mobile phone 20 corresponding to a specific process after the predetermined key operation. The mobile phone communication device 206 is for communicating with other mobile phones and the download server 11 via the mobile phone network 10. The RAM 202 includes a platform memory area as first memory means to be managed by a phone platform described later and an application memory area as second memory means 224 to be managed in an application execution environment described later.

The acceleration sensor 207 is a triaxial acceleration sensor for detecting accelerations $\alpha_X$ and $\alpha_Y$ in the two directions (the X-axis direction and Y-axis direction in FIG. 3) orthogonal to each other within a plane parallel to the operation surface on which the data input keys are provided and acceleration $\alpha_Z$ in the normal line direction (the Z-axis direction in FIG. 3) of the plane. This acceleration sensor 207 is mounted on a circuit board that is not shown, provided inside the mobile phone 20, and a known sensor capable of detecting the accelerations $\alpha_X$, $\alpha_Y$, and $\alpha_Z$ can be used.

Furthermore, the geomagnetic sensor 208 is a triaxial sensor for detecting magnetic field intensity components (magnetic flux density components) of geomagnetism on a three-dimensional coordinate system consisting of the X-axis, the Y-axis, and the Z-axis. In the present embodiment, by using the detection results performed by this geomagnetic sensor 208, the angles $\theta_X$, $\theta_Y$, and $\theta_Z$ around the X-axis, the Y-axis, and the Z-axis are detected. More specifically, a change amount of the geomagnetic direction with respect to a reference geomagnetic direction (reference direction) is detected by using the angles $\theta_X$, $\theta_Y$, and $\theta_Z$ around the X-axis, Y-axis, and Z-axis. Thereby, when the mobile phone changes in attitude from an attitude in which the geomagnetic direction is in the reference direction, the changed attitude can be identified from the respective angles $\theta_X$, $\theta_Y$, and $\theta_Z$. In the description given below, the angle $\theta_X$ around the X-axis is referred to as a pitch angle, the angle $\theta_Y$ around the Y-axis is referred to as a roll angle, and the angle $\theta_Z$ around the Z-axis is referred to as a yaw angle. The yaw angle $\theta_Z$ referred to herein indicates an angle between a horizontal projection Y-axis on a horizontal plane of the Y-axis and the north direction. Therefore, from this yaw angle $\theta_Z$, the direction of the horizontal projection Y-axis of the mobile phone 20 can be recognized. This geomagnetic sensor 208 is also mounted on the circuit board that is not shown, provided inside the mobile phone 20.

The acceleration sensor 207 and the geomagnetic sensor 208 may be constructed as devices separate from the main body of the mobile phone 20. In this case, concerning the acceleration sensor 207 and the geomagnetic sensor 208, an external unit including these sensors 207 and 208 is integrally connected to the main body of the mobile phone 20, more specifically, to the liquid crystal display 27 of the mobile phone 20.

Figure 5:
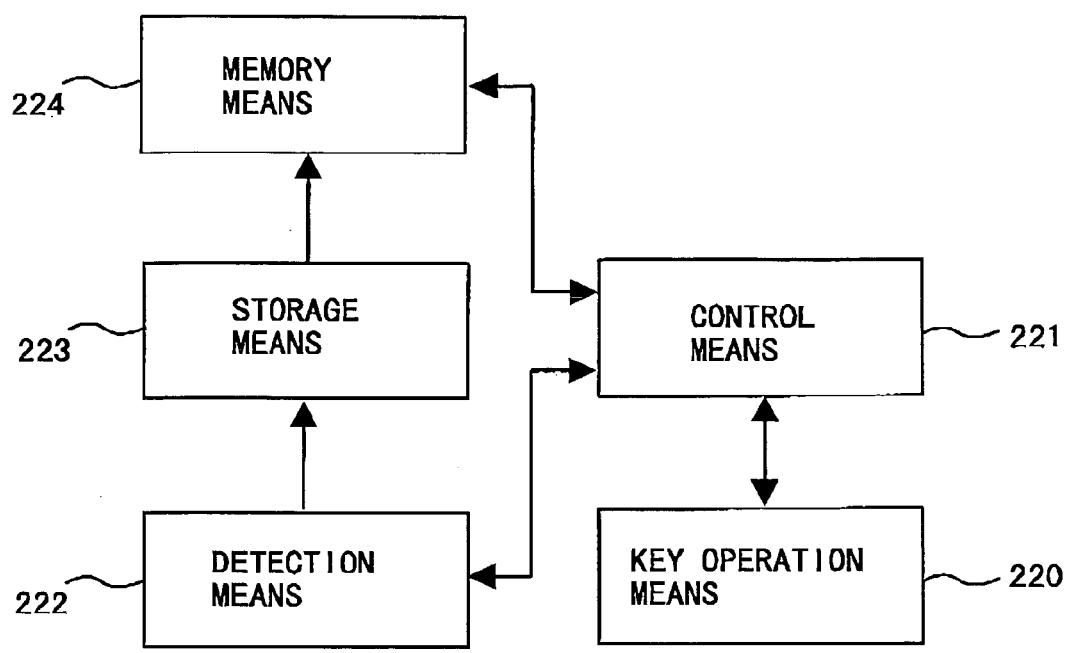
FIG. 5 is a functional block diagram of the mobile phone.
Figure 6:
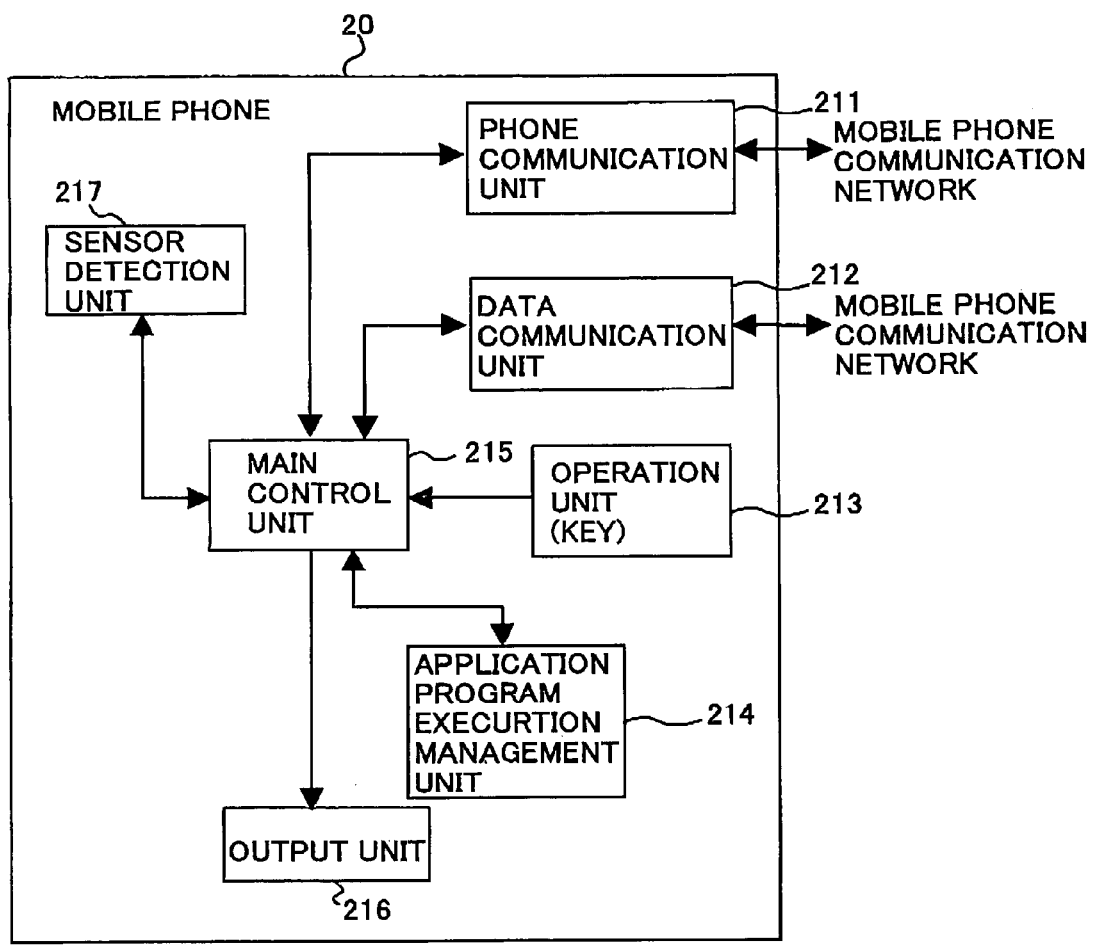
FIG. 6 is a block diagram showing a main configuration of the mobile phone.
Figure 7:
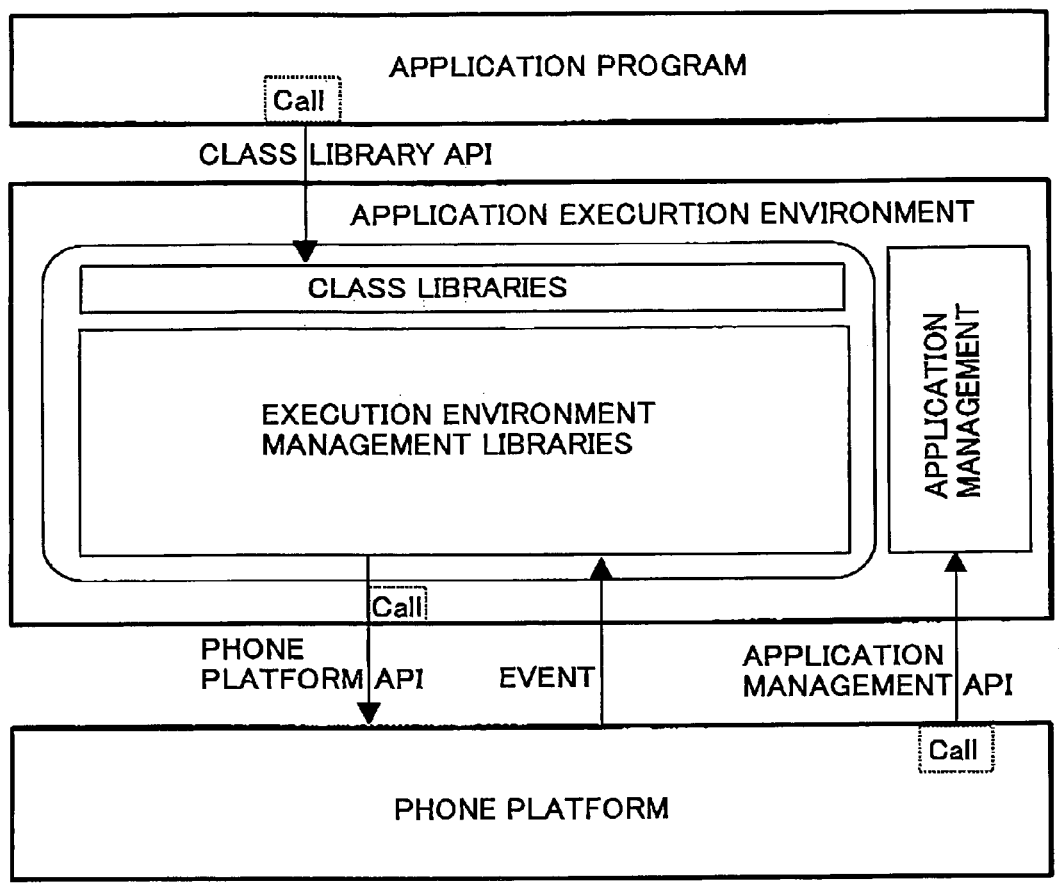
FIG. 7 is an explanatory view of a software structure in the mobile phone.

FIG. 5 is a functional block diagram of the mobile phone 20 according to the present invention. FIG. 6 is a block diagram showing the main configuration of the mobile phone 20, and FIG. 7 is an explanatory view of a software structure in the mobile phone 20.

This mobile phone 20 includes a phone communication unit 211 and a data communication unit 212 as radio communication means, an operation unit 213 as the key operation means 220, an application program execution management unit 214 as the application program execution means, a main control unit 215, an output unit 216, a sensor detection unit 217 as the detection means 222, etc.

The phone communication unit 211 is for radio communication with base stations of the mobile phone network 10 to make phone communication with other mobile phones or fixed line phones, and corresponds to a mobile phone communication device 206, etc., on the hardware configuration described above.

The data communication unit 212 corresponds to the mobile phone communication device 206, etc., on the above-described hardware configuration similarly to the phone communication unit 211. This data communication unit 212 is for exchanging mail with other mobile phones via the mobile phone network 10 or for exchanging electronic mail or browsing web pages on the Internet by being connected to an external communication network such as the Internet via a gateway server from the mobile phone network 10. This data communication unit 212 is also used for downloading an application program provided by the download server 11 via the mobile phone network 10.

The operation unit 213 is comprised of the above-described numeric keypad 21, call start key 22, and call termination key 23, etc., to be operated by the user 1. By operating various keys of the operation unit 213, a user can input data such as a URL into the mobile phone 20, start or terminate calling when an incoming call is received, and select, start, and stop an application program. In addition, by operating various keys of the operation unit 213, a user can download application programs from the download server 11.

The application program execution management unit 214 is comprised of the above-described system bus 200, the CPU 201, and a part of the RAM 202, etc. The application memory area in the RAM 202 functions as the memory means 224 for memorizing motion identification data for identifying the motion of the mobile phone 20 for making the mobile phone 20 execute a specific process. The application program execution management unit 214 functions as the storage means 223 for storing motion identification data obtained from detection data on the motion of the mobile phone 20 after the predetermined key operation detected by the detection means 222 or data obtained by computing the detection data in the memory means 224. The application execution management unit 214 functions as the control means for executing the specific process according to the comparison results between detection data obtained by detecting the motion of the mobile phone 20 by the detection means 222 after the motion identification data is stored or data obtained by computing this detection data and the motion identification data.

The application program execution management unit 214 corresponds to an "application execution environment" at the center of the software structure of FIG. 7, provides software such as a class library, an execution environment managing library, and application management to be used for application programs developed according to object-oriented programming, and manages an application program execution environment. This application execution environment is properly selected according to an application program to be executed. For example, when the application program to be executed is written in JAVA, the JAVA application execution environment is selected. When the application program to be executed is a program written in C language which works in a BREW execution environment, the BREW application execution environment is selected. When the application program to be executed is written in JAVA, the JAVA application execution environment is further created on the BREW application execution environment, thereby the application program can be executed.

The application program can be used by calling class libraries of functions, etc., in the application execution environment via a class library API (application interface). The calling history of the class library of functions, etc., is memorized in an application memory area in the RAM 202 until the virtual execution environment (virtual machine: VM) of the application program is ended. Also, in the application execution environment, various data to be used for the application execution program is also stored in the application memory area. When the various data are used, they are read out from and written on this application memory area. The execution environment management library in the application execution environment can be used by calling a phone platform library in a phone platform described later via a phone platform API.

In the present embodiment, detection data (accelerations $\alpha_X$, $\alpha_Y$, and $\alpha_Z$, pitch angle $\theta_X$, roll angle $\theta_Y$, and yaw angle $\theta_Z$) detected by the sensor detection unit 217 described later composing the acceleration sensor 207 and the geomagnetic sensor 208, etc., are used in the application program. In a conventional application execution environment, the means for using the detection data in the application program was not provided, so that in the present embodiment, a new class (orientation class) is added to the class library. In this orientation class, methods as command sets including getXGravity( ), getYGravity( ), and getZGravity( ) for acquiring data of the accelerations $\alpha_X$, $\alpha_Y$, and $\alpha_X$ and getPitch( ), getRoll( ), and getCompassBearing( ) for acquiring data of the pitch angle $\theta_X$, roll angle $\theta_Y$, an yaw angle $\theta_Z$, etc., are prepared. Therefore, according to the present embodiment, the application program can acquire the detection data by using these methods and use the data.

The main control unit 215 controls the phone communication unit 211, the data communication unit 212, the output unit 216, and the sensor detection unit 217, and is comprised of the above-described system bus 200, the CPU 201, and the RAM 202, etc. This main control unit 215 exchanges control commands and various data with the application program execution management unit 214, and performs controlling in cooperation with it. The main control unit 215 corresponds to the "phone platform" on the lowest side of the software structure of FIG. 7, and executes a control program for controlling the phone communication unit 211, etc., and a user interface, and provides a phone platform library. This phone platform enables execution of various execution environment processes in the application execution environment and calling and use of software of application management in the application execution environment via the application management API. When the application execution environment calls the phone platform library via the phone platform API and uses it, the phone platform executes the process corresponding to the phone platform library. For example, the phone platform reads data memorized in a platform memory area managed by the phone platform in the RAM 202 based on an instruction from the application execution environment using the phone platform library and transfers these data into the application memory area.

The output unit 216 is comprised of the output device 205, etc., including the above-described liquid crystal display 27 and the speaker 28, etc. This output unit 216 displays a web page screen received by the data communication unit 212 on the liquid crystal display 27. The liquid crystal display 27 of this output unit 216 is used for informing a user that the phone communication unit 211 and the data communication unit 212 have received information. More specifically, when the information is received, by the main control unit 215, a receipt informing image is displayed on the liquid crystal display 27 of the output unit 216 or a ring tone is outputted from the speaker 28. Furthermore, this output unit 216 is also used for, during execution of an application program executed in an application execution environment, displaying a menu screen, etc., displaying a guidance screen of guidance information for explaining an operation method, and outputting music relating to the program execution.

The sensor detection unit 217 is comprised of the acceleration sensor 207 and the geomagnetic sensor 208, etc. This sensor detection unit 217 works under the control of the main control unit 215, and the main control unit 215 acquires the detection data detected by the sensor detection unit. The data of the accelerations $\alpha_X$, $\alpha_Y$, and $\alpha_Z$ and the data of the pitch angle $\theta_X$, roll angle $\theta_Y$, and yaw angle $\theta_Z$ as the detection data are memorized in the platform memory area of the RAM 202 as described above. For example, when a user shakes or moves the mobile phone 20 and acceleration is generated in the mobile phone 20, components in the X-axis direction, the Y-axis direction, and the Z-axis direction of the acceleration are detected by the acceleration sensor 207 constituting the sensor detection unit 217. When the detection data are inputted into the main control unit 215, the main control unit 215 can grasp the accelerations in the X-axis direction, the Y-axis direction, and the Z-axis direction from the detection data. The data of the accelerations $\alpha_X$, $\alpha_Y$, and $\alpha_Z$ are temporarily stored in the platform memory area in the RAM 202 by the main control unit 215.

When the attitude of the mobile phone 20 changes, magnetic field intensity components (magnetic flux density components) after this attitude change are detected by the geomagnetic sensor 208 constituting the sensor detection unit 217. The sensor detection unit 217 calculates the respective angles $\theta_X$, $\theta_Y$, and $\theta_Z$ after change in attitude from detection signals detected by the geomagnetic sensor 208. The data of the respective calculated angles $\theta_X$, $\theta_Y$, and $\theta_Z$ are outputted to the main control unit 215 and temporarily stored in the platform memory area in the RAM 202 by the main control unit 215 in the same manner as in the case of the accelerations $\alpha_X$, $\alpha_Y$, and $\alpha_Z$.

When the orientation of the mobile phone 20 changes, magnetic field intensity components (magnetic flux density components) after this orientation change are detected by the geomagnetic sensor 208 constituting the sensor detection unit 217. The sensor detection unit 217 calculates the yaw angle $\theta_Z$ after the orientation change from detection signals detected by the geomagnetic sensor 208. The data of the calculated yaw angle $\theta_Z$ is also outputted to the main control unit 215 and temporarily stored in the platform memory area in the RAM 202 by the main control unit 215.

As a method for acquiring the data of the accelerations $\alpha_X$, $\alpha_Y$, and $\alpha_Z$ and the angles $\theta_X$, $\theta_Y$, and $\theta_Z$ to be stored in the platform memory area from the sensor detection unit 217 by the main control unit 215, the following methods are available. For example, there is an acquiring method in which the main control unit 215 sends a request to the sensor detection unit 217, and in response thereto, the sensor detection unit 217 outputs the data and the main control unit 215 receives the data. Also, for example, an acquiring method may be employed in which data continuously outputted from the sensor detection unit 217 regardless of receiving of a request is received by the main control unit 215 as appropriate. It is also possible to employ an acquiring method in which the main control unit 215 sends a request to the sensor detection unit 217 in response to a request outputted by the application program via the application program execution management unit 214, and in response thereto, the sensor detection unit 217 outputs data and the main control unit 215 receives the data.

A control program for creating a phone platform to operate the mobile phone 20 according to predetermined procedures is memorized in the RAM 202 and ROM 203. The basic OS (operating system) programs, programs for creating the application execution environment, and application programs are also memorized in the RAM 202 and the ROM 203. These programs are called out to a work area in the CPU 201 and RAM 202 and executed as appropriate.

Next, operations for executing an application program using the data of the accelerations $\alpha_X$, $\alpha_Y$, and $\alpha_Z$ and the angles $\theta_X$, $\theta_Y$, and $\theta_Z$ will be described. In the present embodiment, this application program is a flight simulator as a game.

Figure 8:
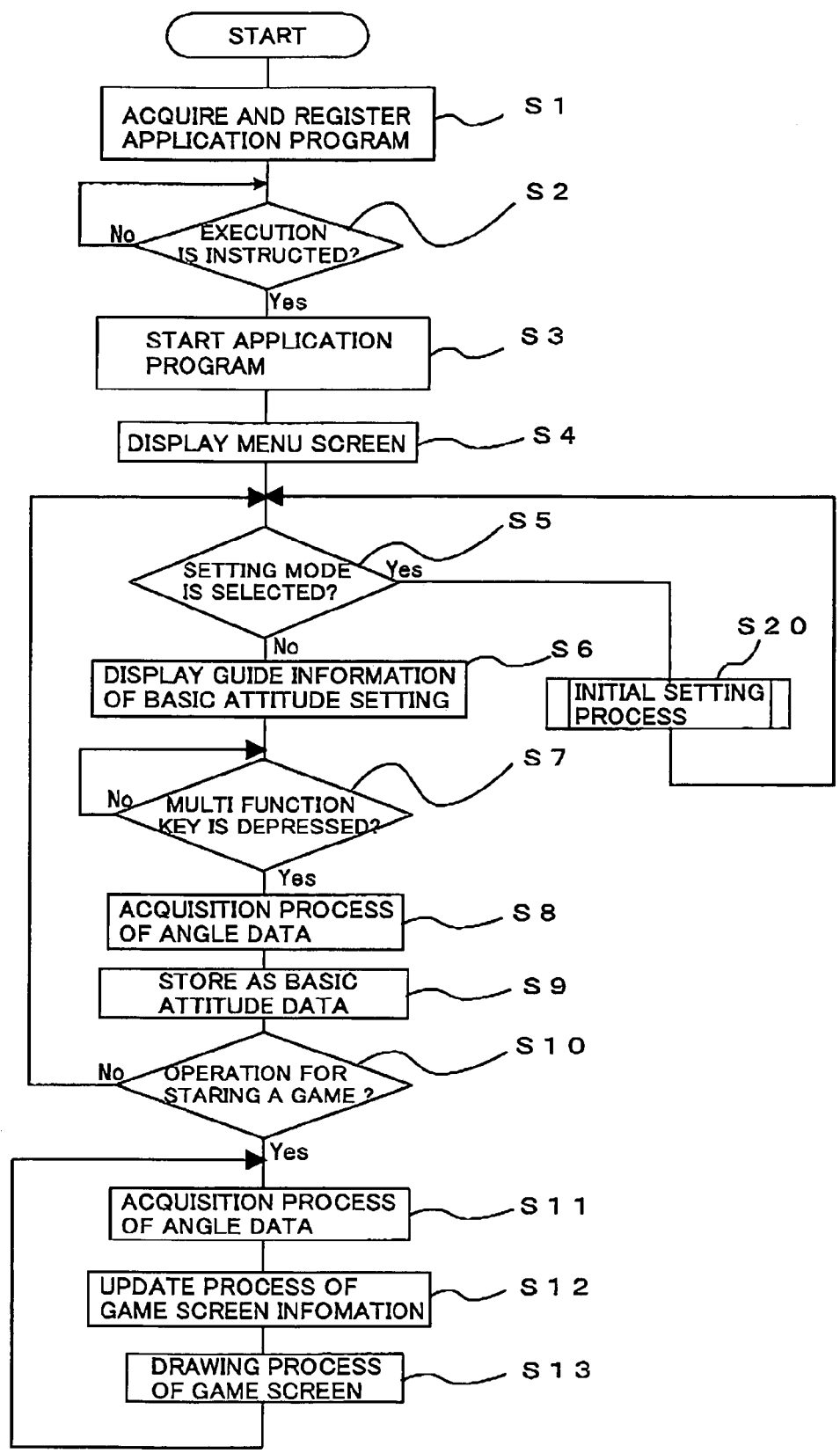
FIG. 8 is a flowchart showing a flow of process for executing an application program in the mobile phone.
Figure 9:
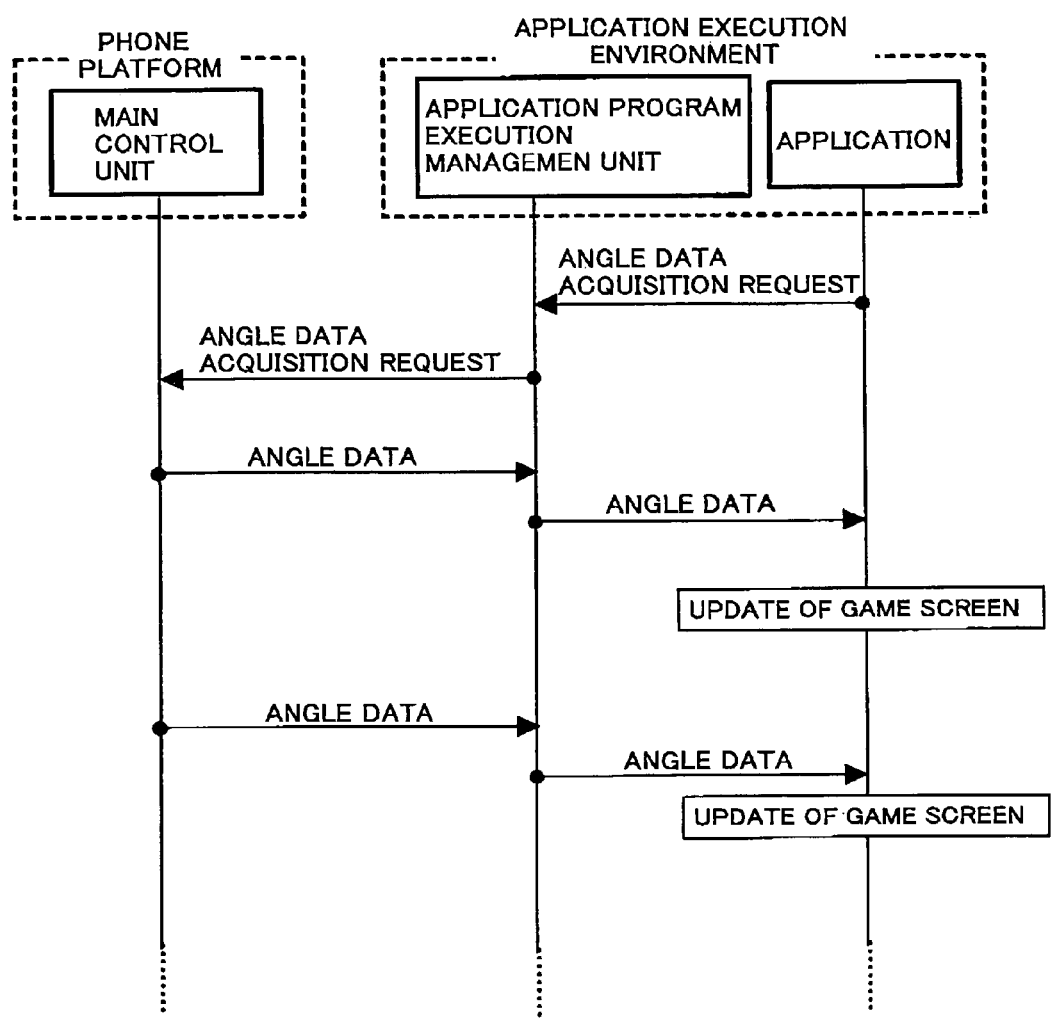
FIG. 9 is a sequence flow diagram when the application program is executed in the mobile phone.

FIG. 8 is a flowchart showing a flow of process for executing an application program for the flight simulator. FIG. 9 is a sequence flow diagram when the application program for the flight simulator is executed.

First, the user 1 acquires the application program for the flight simulator by downloading from the download server 11, and registers the application program (S1). More specifically, the user 1 accesses the download server 11 by operating the keys of the operation unit 213. Thereby, a download selection screen for selecting a downloadable application program is displayed on the liquid crystal display 27. In this download selection screen, the application program to be executed is selected by using the scroll key 24, and by depressing the multifunction key 25, the main control unit 215 controls the data communication unit 212 and downloads the application program from the download server 11. The thus downloaded application program is memorized in the RAM 102 by the main control unit 215.

In order to execute the downloaded application program, the user 1 makes the liquid crystal display 27 display an application selection screen for selecting the application program to be executed by operating the keys of the operation unit 213. Then, in this application selection screen, the user selects the application program for the flight simulator to be executed by using the scroll key 24 and depresses the multifunction key 25. Then, in the phone platform shown in FIG. 7, that is, in the main control unit 215 shown in FIG. 6, an application program execution instruction is inputted (S2). Thereby, the main control unit 215 reads out the application program for the flight simulator and starts the application program (S3). When the application program starts, in the application execution environment shown in FIG. 7, that is, on the application program execution management unit 214 shown in FIG. 6, the application program works.

When this program starts, first, a menu screen is displayed on the liquid crystal display 27 (S4). This menu screen is a screen for selecting either one of the game mode and the setting mode described later. When the user 1 selects the setting mode described later by operating the scroll key 24 of the operation unit 213 or moving the mobile phone as set by execution of the setting mode of the second operation example 2 described later (S5), an initial setting process is performed (S20). Details of this initial setting process will be described later.

On the other hand, when the user 1 starts the game, he/she selects a game mode by operating the scroll key 24 of the operation unit 213 or moving the mobile phone as set by execution of the setting mode described later (S5). Thereby, on the liquid crystal display 27 of the output unit 216, guidance information about setting of the basic attitude is displayed (S6). This guidance information is indicated as a message such as "determine the way of holding the mobile phone when playing the game and depress the multifunction key." Concerning output of this guidance information, along with or instead of the indication on the liquid crystal display 27, guidance may be given by voice by using an external speaker, etc., of the output unit 216. The contents of the guidance information may be described in a user's manual, etc., and outputting of the guidance information may be omitted. The user 1 guided by this guidance information holds the mobile phone in the way which makes it easy to play the game, for example, enables the mobile phone to take the attitude shown in FIG. 10A, and then depresses the multifunction key 25 as a specific key (S7). Then, the application program execution management unit 214 functions as the storage means 223 and stores angle data $\theta_X$, $\theta_Y$, and $\theta_Z$ acquired by the application program when the key was depressed as basic attitude data $\theta_{X0}$, $\theta_{Y0}$, and $\theta_{Z0}$ in the application memory area (basic attitude data memory means 224) in the RAM 202 (S8, S9).

Based on the basic attitude data, the attitude (basic attitude) of the mobile phone 20 when the multifunction key is depressed can be recognized.

Thereafter, when the user 1 performs a key operation for staring the game (S10), the game is started. Thereby, on the liquid crystal display 27 of the output unit 216, a game screen imitating the field of view from a pilot's seat of an airplane is displayed. Then, the application program starts an angle data acquisition process for acquiring data of the pitch angle $\theta_X$, roll angle $\theta_Y$, and yaw angle $\theta_Z$ to be detected by the sensor detection unit 217 substantially in real time. The program updates the contents of the game screen displayed on the liquid crystal display 27 according to the acquired data. For example, when the user 1 tilts the antenna side of the mobile phone 20 vertically downward, the pitch angle $\theta_X$ changes accordingly, and the game screen is updated to a game screen for which the nose of the airplane in the game tilts vertically downward. For example, when the user 1 tilts the display surface of the liquid crystal display 27 of the mobile phone 20 to the left, the roll angle $\theta_Y$ changes accordingly, and the game screen is updated to a game screen for which the airplane in the game tilts to the left.

Figure 10A:
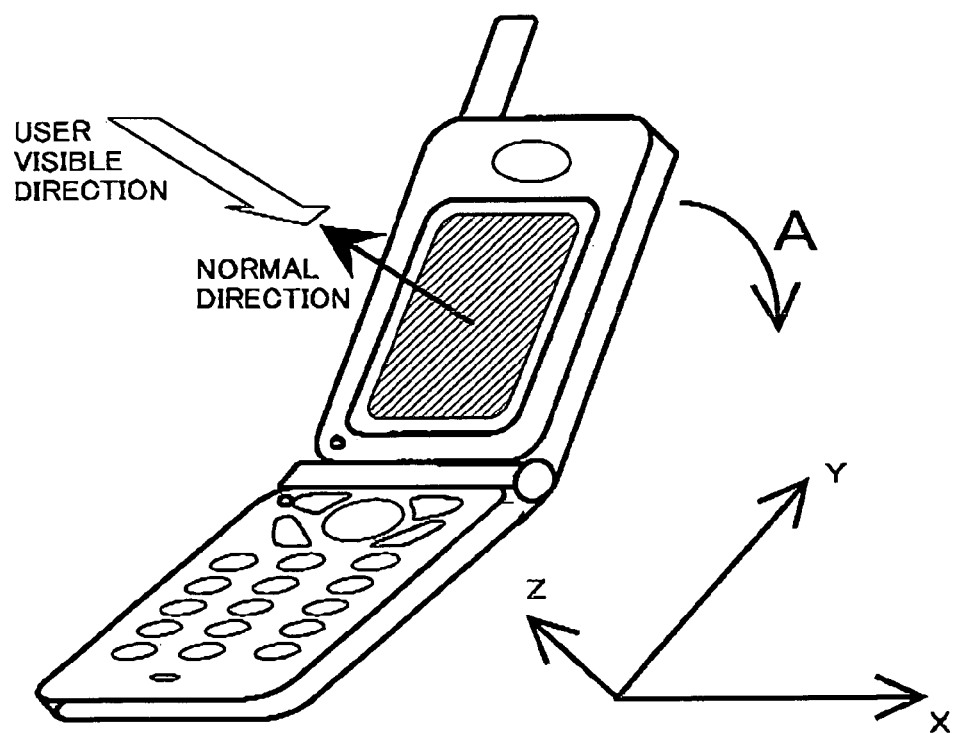
FIG. 10A is an explanatory view of a basic attitude before the attitude of the mobile phone is changed.
Figure 10B:
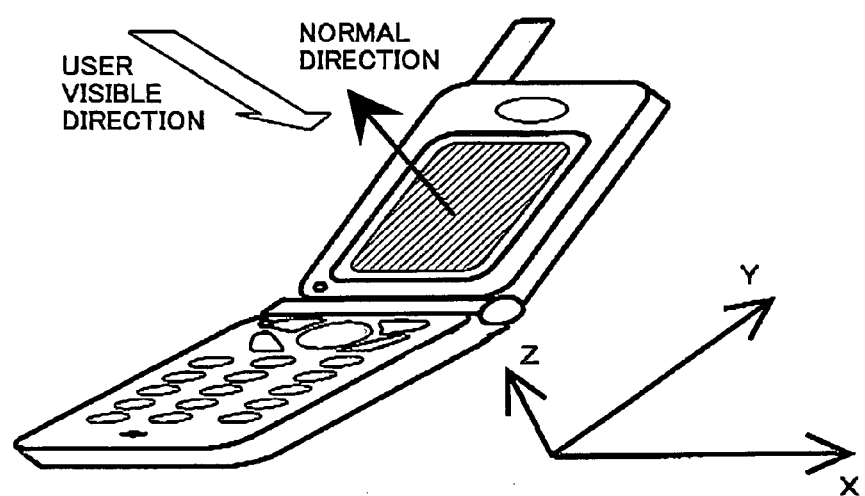
FIG. 10B is an explanatory view when the phone is changed in attitude by rotating it around the X-axis.

More specifically, for example, when the user 1 tilts the mobile phone 20 toward the direction shown by the arrow A in FIG. 10A so as to turn the nose of the airplane in the game vertically downward, the mobile phone 20 takes the attitude shown in FIG. 10B. The attitude after this attitude change is detected by the geomagnetic sensor 208 of the sensor detection unit 217, and the data of the angles $\theta_X$, $\theta_Y$, and $\theta_Z$ are delivered to the application program (S11). Thereby, the application program execution management unit 214 updates the game screen information for displaying a game screen on the liquid crystal display 27 according to the contents of the application program (S12). For example, when the attitude of the mobile phone 20 is changed from the basic attitude of FIG. 10A to the attitude shown in FIG. 10B, the game screen imitating the field of view from a pilot's seat of an airplane is scrolled to the upper side of the screen, and the game screen information is updated as if the nose of the airplane in the game turned vertically downward. Thereafter, a process for drawing the updated game screen on the display surface of the liquid crystal display 27 is executed (S13). By thus performing updating of the game screen information based on an attitude change from the basic attitude, regardless of the attitude of the mobile phone when the user 1 plays the game, proper updating can be performed.

In the angle data acquisition process, as shown in FIG. 9, the started application program sends an angle data acquisition request to the application program execution management unit 214 in the application execution environment. The application program execution management unit 214 that received the request sends an angle data acquisition request as a data transfer command to the main control unit 215 of the phone platform. The main control unit 215 that received the request sends the data of the pitch angle $\theta_X$, the roll angle $\theta_Y$, and the yaw angle $\theta_Z$ memorized in the platform memory area in the RAM 202 to the application program execution management unit 214, and these data are delivered to the application program. Then, the application program which received the data of the pitch angle $\theta_X$, the roll angle $\theta_Y$, and the yaw angle $\theta_Z$ memorizes the data in the application memory area in the RAM 202. Then, it updates the game screen information to be outputted to the output unit 216 based on the pitch angle $\theta_X$, the roll angle $\theta_Y$, and the yaw angle $\theta_Z$.

Details of the updating of the game screen information are as follows.

The application program execution management unit 214 which executes the application program calculates differences between the data of the angles $\theta_X$, $\theta_Y$, and $\theta_Z$ acquired at S9 described above and the basic attitude data $\theta_{X0}$, $\theta_{Y0}$, and $\theta_{Z0}$ memorized in the application memory area. Herein, for example, it is assumed that the mobile phone 20 has been changed from the basic attitude of FIG. 10A to the attitude of FIG. 10B. In this case, only the pitch angle $\theta_X$ changes from the basic attitude. By calculating a difference between the data of the pitch angle $\theta_X$ at this time and the basic attitude data $\theta_{X0}$, the rotation angle (rotation angular displacement) of the Y-axis of the mobile phone 20 to the minus direction (rotation direction) around the X-axis from the basic attitude shown in FIG. 10A can be recognized. Then, according to the recognized rotation direction and rotation angular displacement, the application program execution management unit 214 updates the game screen information as if the nose of the airplane in the game turned vertically downward by scrolling the game screen imitating the field of view from a pilot's seat of an airplane to the upper side of the screen.

First Operation Example

Next, an initial setting process as a feature of the present invention will be described.

Figure 11:
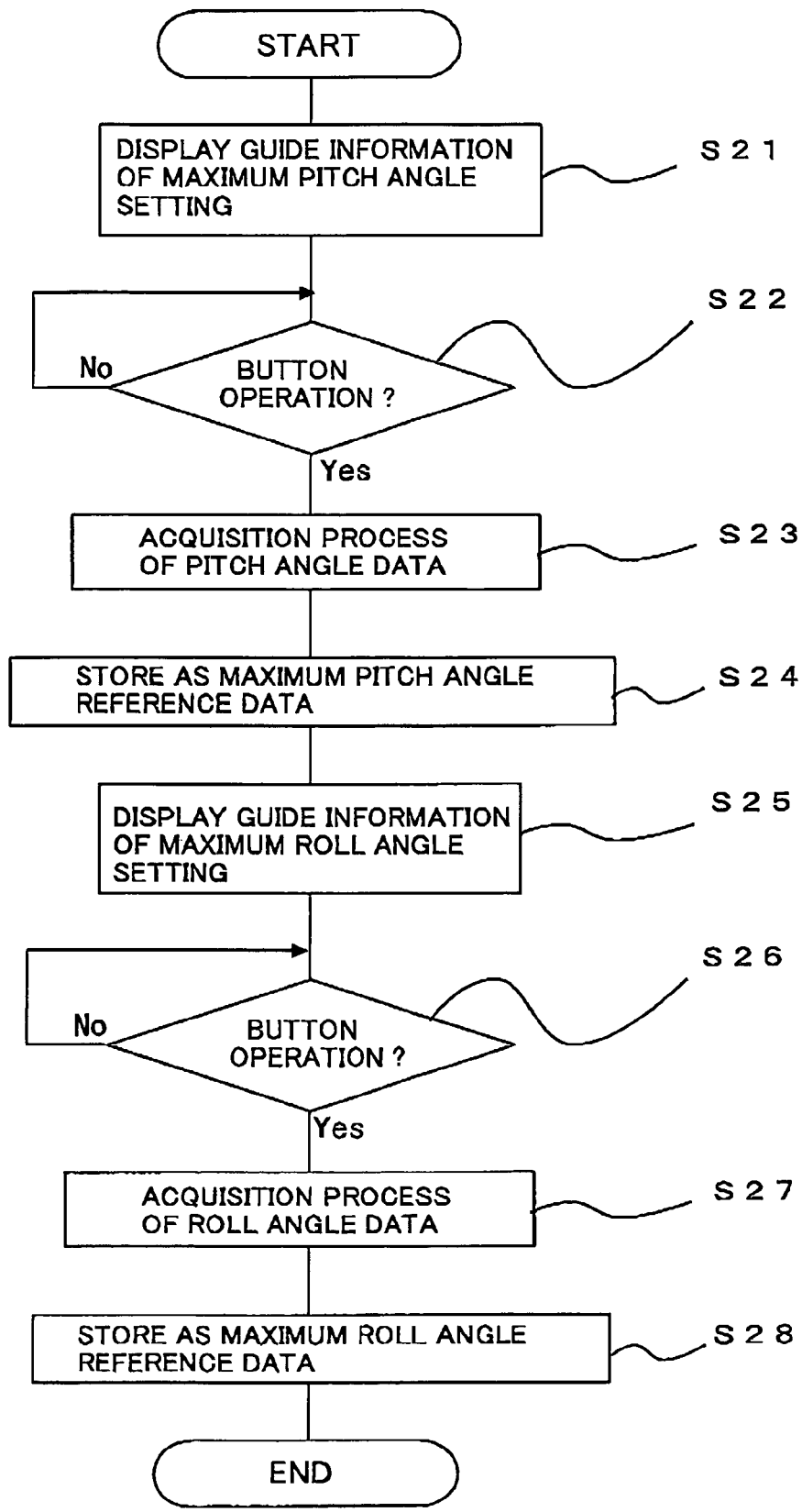
FIG. 11 is a flowchart showing a flow of initial setting process for setting a maximum pitch angle and a maximum roll angle to be used in an application program to be executed in the mobile phone.

FIG. 11 is a flowchart showing a flow of process for setting a maximum pitch angle and a maximum roll angle in the initial setting process to be performed when the user 1 selects the setting mode on the menu screen. Herein, setting of a maximum pitch angle means setting of a pitch angle $\theta_X$ corresponding to a maximum pitch angle for controlling an airplane in the game. Setting of a maximum roll angle means setting of a roll angle $\theta_Y$ corresponding to a maximum roll angle for controlling the airplane in the game. In the present embodiment, yaw angle data is not used for controlling the airplane in the game, so that setting of a maximum yaw angle is not performed.

On a setting mode selection screen displayed according to selection of the setting mode on the menu screen by the user 1, when the user 1 selects the setting mode for the maximum pitch angle and the maximum roll angle, guidance information about setting of the maximum pitch angle is displayed on the liquid crystal display 27 of the output unit 216 (S21). This guidance information is indicated as a message such as "after depressing the multifunction key, tilt the mobile phone so as to move the antenna to the deeper side to an angle as a maximum pitch angle for controlling the airplane in the game, and then depress the multifunction key again." Concerning the outputting of this guidance information, along with or instead of the indication on the liquid crystal display 27, the guidance information may be given by voice by using an external speaker, etc., of the output unit 216. The same applies to the guidance information described later. When the user 1 guided by this guidance information depresses the multifunction key (S22), the application program starts an angle data acquisition process for acquiring data of the pitch angle $\theta_X$ detected by the sensor detection unit 217 substantially in real time (S23). Then, the user 1 gradually tilts the mobile phone 20, and when its pitch angle $\theta_X$ reaches his/her preferred angle that becomes a maximum pitch angle for controlling the airplane in the game, the user depresses the multifunction key. Thereby, the application program execution management unit 214 functions as the storage means 223 and stores the data of the pitch angle $\theta_X$ at this point in time of depressing as maximum pitch angle reference data $\theta_{Xmax}$ that are motion identification data in the reference data memory area (memory means 224) in the application memory area in the RAM 202 (S24).

When the maximum pitch angle setting process is thus finished, setting of the maximum roll angle is subsequently performed. More specifically, when the storage process of S24 is finished, guidance information about setting of the maximum roll angle is displayed on the liquid crystal display 27 of the output unit 216 (S25). This guidance information is indicated as a message such as "after depressing the multifunction key, tilt the mobile phone around the vertical axis (Y-axis) on the key operation surface as a rotation axis to an angle as a maximum roll angle for controlling the airplane in the game, and depress the multifunction key again." When the user 1 guided by this guidance information depresses the multifunction key (S26), the application program starts an angle data acquisition process for acquiring data of the roll angle $\theta_Y$ detected by the sensor detection unit 217 substantially in real time (S27). Then, the user 1 gradually tilts the mobile phone 20, and when its pitch angle $\theta_Y$ reaches his/her preferred angle that becomes a maximum roll angle for controlling the airplane in the game, the user depresses the multifunction key. Thereby, the application program execution management unit 214 functions as the storage means 222 and stores the data of the roll angle $\theta_Y$ at the point in time of depressing as maximum roll angle reference data $\theta_{Imax}$ that are motion identification data in the reference data memory area in the application memory area in the RAM 202 (S28).

After the initial setting process of the maximum pitch angle and the maximum roll angle is thus finished, the user 1 starts the game. In game screen information updating during this game, first, the application program execution management unit 214 calculates differences between the data of the angles $\theta_X$, $\theta_Y$, and $\theta_Z$ acquired at S9 described above and the basic attitude data $\theta_{X0}$, $\theta_{Y0}$, and $\theta_{Z0}$ memorized in the reference data memory area. Herein, for example, when the mobile phone 20 is changed from the basic attitude of FIG. 10A to the attitude of FIG. 10B, difference data between the data of the pitch angle $\theta_X$ at this time and the basic attitude data $\theta_{X0}$ is calculated. Thereby, the rotation angle (rotation angular displacement) of the Y-axis of the mobile phone 20 to the minus direction (rotation direction) around the X-axis from the basic attitude shown in FIG. 10A can be recognized. Then, the application program execution management unit 214 functions as the control means 221 and calculates a value by dividing an absolute value of the calculated difference data by the maximum pitch angle reference data $\theta_{Xmax}$ memorized in the reference data memory area. This calculated value indicates what percent of the maximum pitch angle the Y-axis of the mobile phone 20 rotated around the X-axis from the basic attitude shown in FIG. 10A. Thereafter, the application program execution management unit 214 performs a process (specific process) for updating the game screen information corresponding to the calculated value and the recognized rotation direction.

As the calculated value becomes larger, the change in pitch angle of the airplane in the game becomes greater, and as the calculated value becomes smaller, the change in pitch angle of the airplane in the game becomes smaller. Therefore, a user who wants to sensitively control the airplane in the game can set the maximum pitch angle reference data $\theta_{Xmax}$ to a large value at the time of initial setting process of the maximum pitch angle. In this case, if the pitch angle $\theta_X$ when the mobile phone 20 changes in attitude is the same, the calculated value becomes smaller than in the case where the maximum pitch angle reference data $\theta_{Xmax}$ is small, and the change in pitch angle of the airplane in the game becomes smaller. Therefore, it becomes possible to finely change the pitch angle of the airplane in the game, and sensitive control becomes possible.

Not only the rotation angular displacement but also the rotation angular velocity may be reflected in the control of the airplane in the game. For example, if the mobile phone 20 is suddenly changed in attitude, the rotation angular velocity of the pitch angle $\theta_X$ becomes great. In this case, it is regarded that the pitch angle of the airplane in the game has also been suddenly changed and this can be reflected in the game contents. As the rotation angular velocity, for example, concerning the pitch angle $\theta_X$, a value obtained by dividing the acquired pitch angle $\theta_X$ by the acquisition time period can be used.

In the above description, the pitch angle $\theta_X$ is described, however, the same effect can also be obtained for the roll angle $\theta_Y$.

Second Operation Example

Next, in the initial setting process which is performed when the user selects the setting mode on the menu screen, a process for setting an operation method of mode selection will be described. This process is for setting an operation method for selecting either the game mode or the setting mode on the menu screen according to the preference of the user 1.

Figure 12:
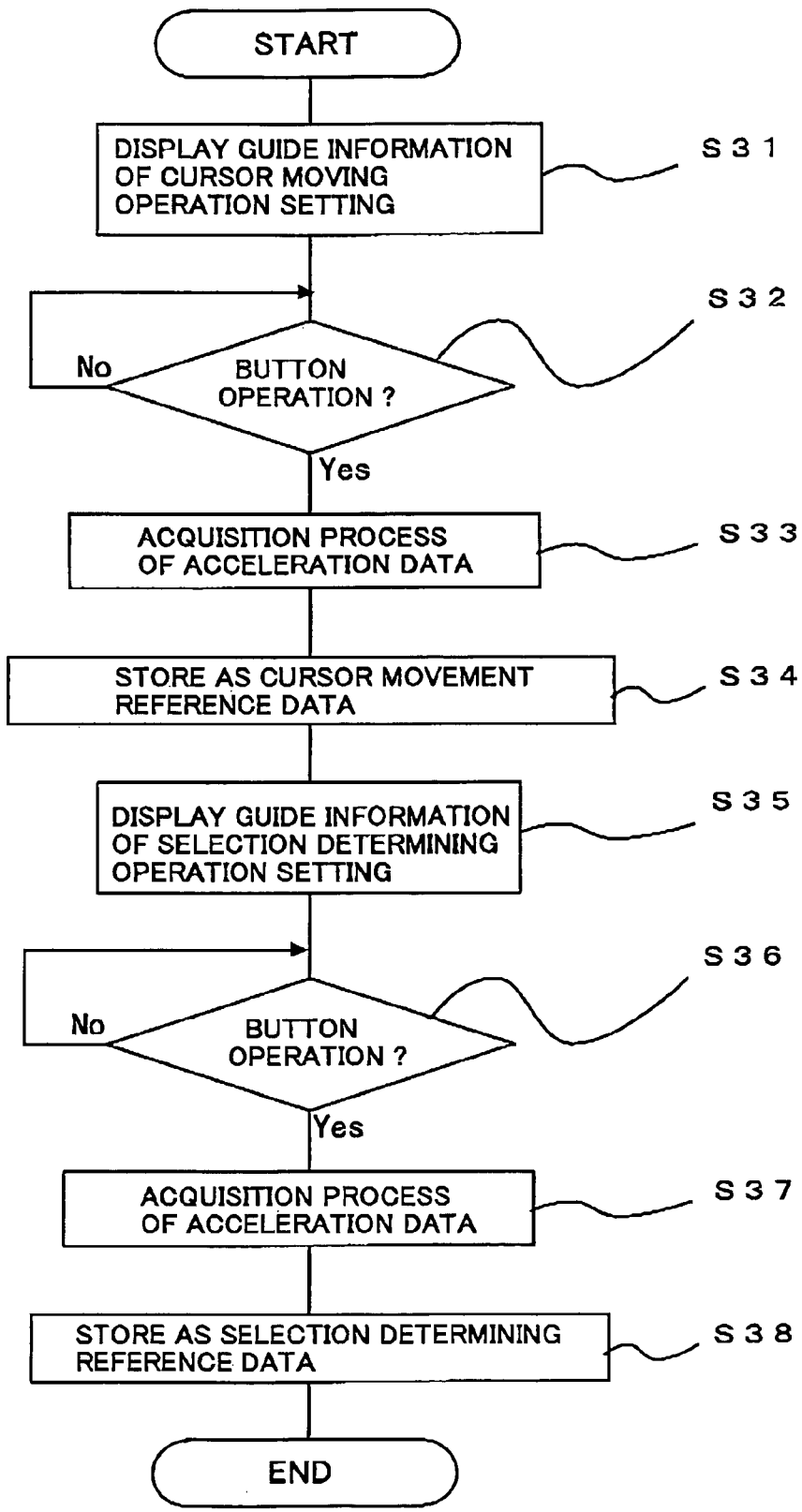
FIG. 12 is a flowchart showing a flow of process for setting a mode selecting operation method to be performed on a menu screen when the application program is executed in the mobile phone.

FIG. 12 is a flowchart showing a flow of the process for setting an operation method of mode selection. On a setting mode selection screen displayed when the user 1 selects the setting mode on the menu screen, when the user 1 selects an operation method setting mode of mode selection, guidance information about setting of a cursor moving operation is displayed on the liquid crystal display 27 of the output unit 216 (S31). This guidance information is indicated as a message such as "after depressing the multifunction key, act to move the cursor on the menu screen." When the user 1 who was guided by this guidance information depresses the multifunction key (S32), the application program starts an acceleration data acquisition process for acquiring data of accelerations $\alpha_X$, $\alpha_Y$, and $\alpha_Z$ detected by the sensor detection unit 217 substantially in real time (S33). Then, the user 1 moves the mobile phone 20 in his/her preferred direction with his/her preferred force. Thereby, the application program execution management unit 214 acquires maximum values of absolute values of the data of the respective accelerations $\alpha_X$, $\alpha_Y$, and $\alpha_Z$ until the accelerations become zero since generation of the accelerations in the mobile phone 20. Then, the application program execution management unit 214 functions as the storage means 222 and stores the data for identifying predetermined magnitude ranges around the maximum values of the acquired accelerations and predetermined angle ranges around the directions of the accelerations (hereinafter, these ranges are referred to as "acceleration ranges") as cursor movement reference data that are motion identification data in the reference data memory area (memory means 224) of the application memory area in the RAM 202 (S34).

When the cursor moving operation setting process is thus finished, a selection determining operation setting process is subsequently performed. More specifically, when the storage process of S34 is finished, guidance information about setting of a selection determining operation is displayed on the liquid crystal display 27 of the output unit 216 (S35). This guidance information is indicated as a message such as "after depressing the multifunction key, act to determine the selection of the cursor on the menu screen. However, act differently from the action for moving the cursor on the menu screen." When the user guided by this guidance information depresses the multifunction key (S36), the application program starts an acceleration data acquisition process for acquiring data of accelerations $\alpha_X$, $\alpha_Y$, and $\alpha_Z$ detected by the sensor detection unit 217 substantially in real time (S37). Then, the user 1 moves the mobile phone 20 in a direction with a force according to his/her preference differently from those in the motion set for the cursor moving operation. Thereby, the application program execution management unit 214 acquires maximum vales of absolute values of the data of the accelerations $\alpha_X$, $\alpha_Y$, and $\alpha_Z$ until the accelerations become zero since generation of the accelerations in the mobile phone. Then, the application program execution management unit 214 functions as the storage means 222 and stores data for identifying acceleration ranges of the acquired accelerations as selection determining reference data that are motion identification data in the reference data memory area (memory means 224) (S38).

Figure 13:
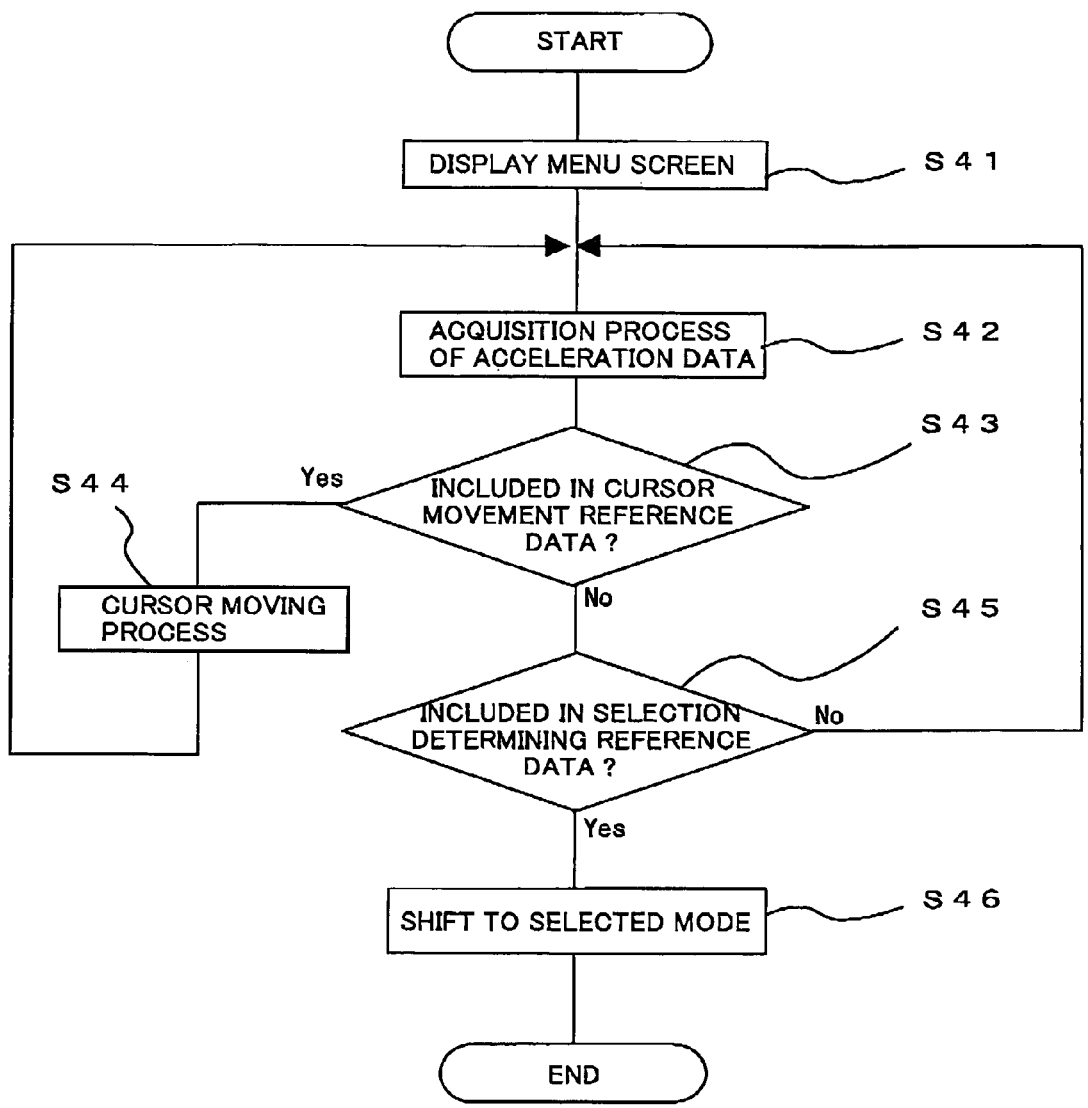
FIG. 13 is a flowchart showing a flow of process of mode selection on the menu screen.

FIG. 13 is a flowchart showing a flow of process of mode selection on the menu screen.

After the initial setting process for the mode selection operation method is finished, mode selection is performed on the menu screen displayed on the liquid crystal display 27. In this case, the user 1 acts as set in the mode selection operation method setting process to move the cursor on the menu screen or determine the mode selected by the cursor. More specifically, when the menu screen is displayed on the liquid crystal display 27 (S41), if the user 1 moves the mobile phone 20, accelerations are detected by the acceleration sensor 207 of the sensor detection unit 217, and the data of the accelerations $\alpha_X$, $\alpha_Y$, and $\alpha_Z$ are delivered to the application program (S42). The application program execution management unit 214 functions as the control means 221 and determines whether the data of the acquired accelerations $\alpha_X$, $\alpha_Y$, and $\alpha_Z$ are included in the acceleration ranges identified from the cursor movement reference data memorized in the reference data memory area (S43). When it is determined at S43 that the data are included, the application program execution management unit 214 performs a cursor movement process (specific process) (S44). More specifically, a process for moving the position of the cursor image displayed on the menu screen to the position of the next mode is performed. On the other hand, when it is determined at S43 that the data are not included, the application program execution management unit 214 determines whether the data of the acquired accelerations $\alpha_X$, $\alpha_Y$, and $\alpha_Z$ are included in acceleration ranges identified from the selection determining reference data memorized in the reference data memory area (S45). When it is determined at S45 that the data are included, the application program execution management unit 214 performs a process for shifting to the mode selected by the cursor on the menu screen (specific process) (S46). More specifically, when the cursor selects the game mode, the above-described game is started, and when the cursor selects the setting mode, the above-described setting mode is started.

In the above description, the case where cursor movement and selection determination are performed by using the data of the accelerations $\alpha_X$, $\alpha_Y$, and $\alpha_Z$ is described, however, these can also be performed by using the data of the respective angles $\theta_X$, $\theta_Y$, and $\theta_Z$.

Figure 14:
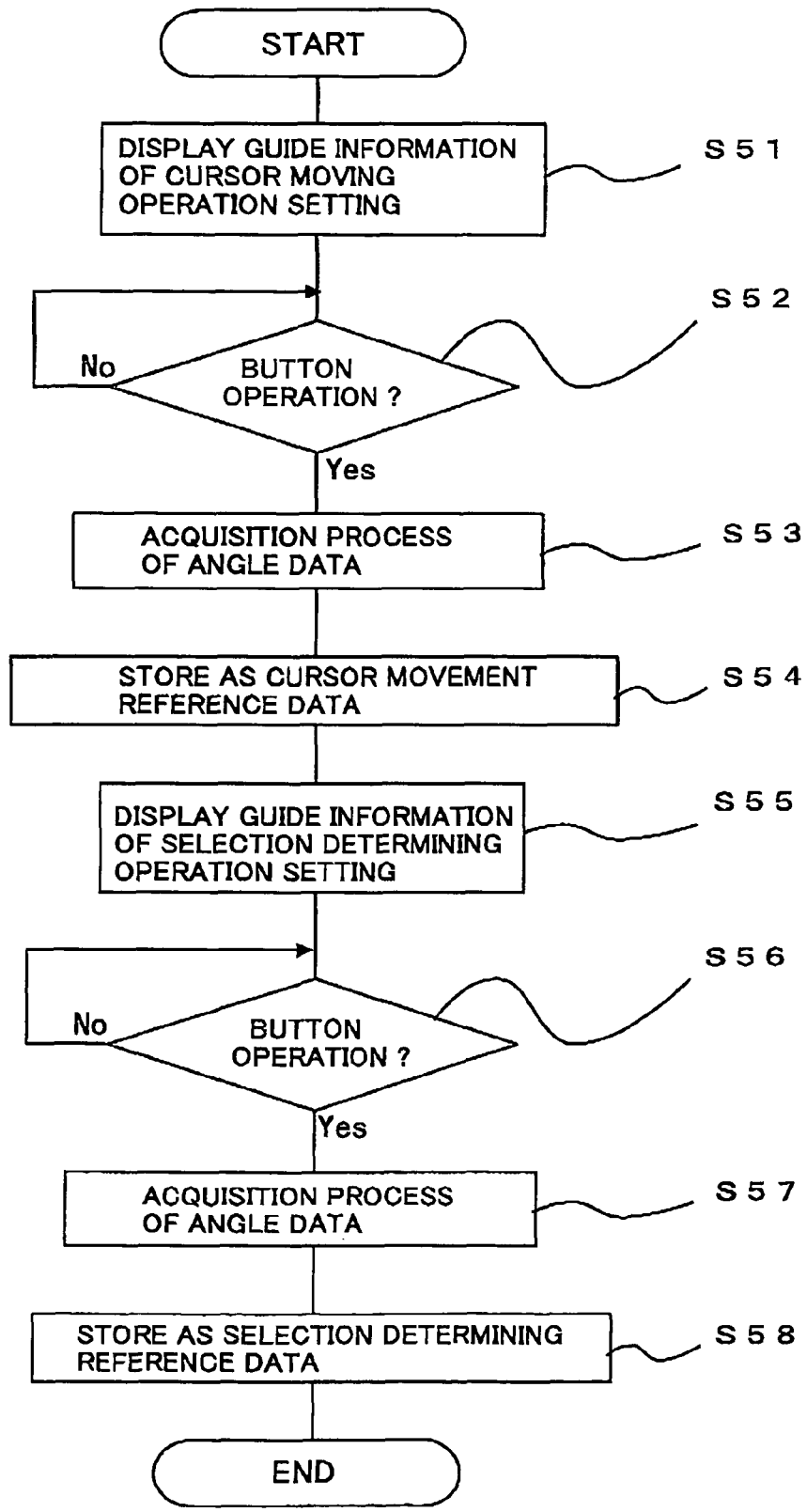
FIG. 14 is a flowchart showing a flow of process for setting a mode selecting operation method to be performed on a menu screen relating to another operation example.

FIG. 14 is a flowchart showing a flow of process for setting an operation method of mode selection by using the data of the respective angles $\theta_X$, $\theta_Y$, and $\theta_Z$. On the setting mode selection screen displayed when the user 1 selects the setting mode on the menu screen, when the user 1 selects the mode selection operation method setting mode, guidance information about setting of the cursor moving operation is displayed on the liquid crystal display 27 of the output unit 216 (S51). This guidance information is indicated as a message such as "after depressing the multifunction key, act to move the cursor on the menu screen." When the user 1 guided by this guidance information depresses the multifunction key (S52), the application program starts an angle data acquisition process for acquiring data of the angles $\theta_X$, $\theta_Y$, and $\theta_Z$ detected by the sensor detection unit 217 substantially in real time (S53). Then, the user 1 changes the attitude of the mobile phone 20 from the basic attitude of FIG. 10 to, for example, the attitude shown in FIG. 10B. The application program execution management unit 214 calculates differences between the data of the respective angles $\theta_X$, $\theta_Y$, and $\theta_Z$ acquired at S53 described above and the basic attitude data $\theta_{X0}$, $\theta_{Y0}$, and $\theta_{Z0}$ memorized in the application memory area. Then, the application program execution management unit 214 stores data for identifying predetermined angle ranges around the differences of the respective calculated angles as cursor movement reference data that are motion identification data in the reference data memory area (memory means 224) in the application memory area in the RAM 202 (S54).

When the cursor moving operation setting process is thus finished, a selection determining operation setting process is subsequently performed. More specifically, when the storage process of S54 is finished, guidance information about setting of the selection determining operation is displayed on the liquid crystal display 27 of the output unit 216 (S55). This guidance information is indicated as a message such as "after depressing the multifunction key, act to determine the selection of the cursor on the menu screen. However, act differently from the action for moving the cursor on the menu screen." When the user 1 guided by this guidance information depresses the multifunction key (S56), the application program starts an angle data acquisition process for acquiring the data of the angles $\theta_X$, $\theta_Y$, and $\theta_Z$ detected by the sensor detection unit 217 substantially in real time (S57). Then, the user 1 changes the attitude of the mobile phone 20 in a direction at an angle according to his/her preference differently from the motion set for the cursor moving operation from the basic attitude. The application program execution management unit 214 calculates differences between the data of the angles $\theta_X$, $\theta_Y$, and $\theta_Z$ acquired at S57 described above and the basic attitude data $\theta_{X0}$, $\theta_{Y0}$, and $\theta_{Z0}$ memorized in the application memory area. Then, the application program execution management unit 214 stores data for identifying angle ranges of the differences of the respective acquired angles as selection determining reference data that are motion identification data in the reference data memory area (memory means 224) (S58).

Figure 15:
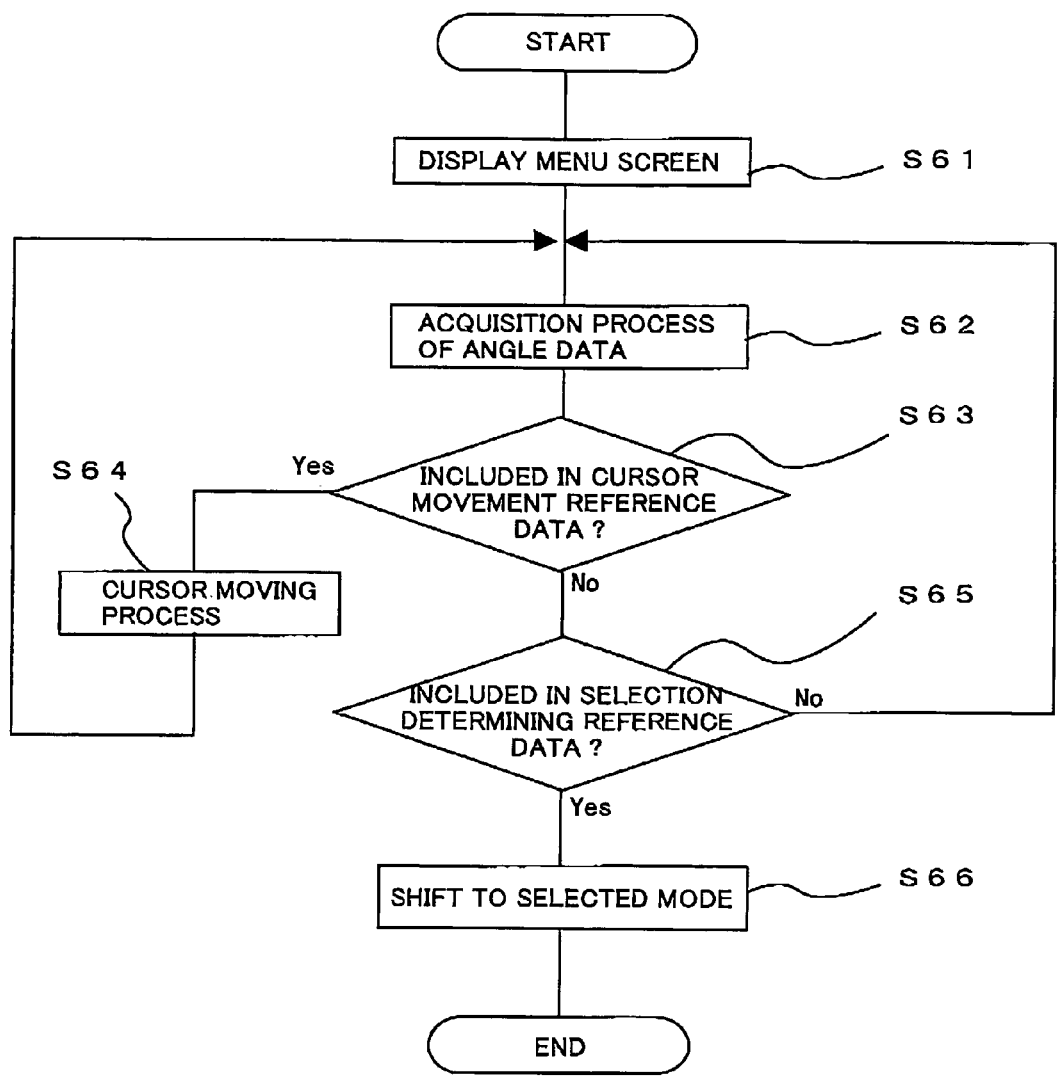
FIG. 15 is a flowchart showing a flow of process of mode selection on the menu screen.

FIG. 15 is a flowchart showing a flow of process of mode selection on the menu screen. After the initial setting process for the mode selection operation method is finished, mode selection is performed on the menu screen displayed on the liquid crystal display 27. In this case, the user 1 can move the cursor on the menu screen or determine a mode selected by the cursor by acting as set in the mode selecting operation method setting process. More specifically, when the menu screen is displayed on the liquid crystal display 27 (S61), if the user 1 changes the attitude of the mobile phone 20 from the basic attitude, the angles are detected by the geomagnetic sensor 208 of the sensor detection unit 217, and the data of the angles $\theta_X$, $\theta_Y$, and $\theta_Z$ are delivered to the application program (S42). The application program execution management unit 214 calculates differences between the data of the respective acquired angles $\theta_X$, $\theta_Y$, and $\theta_Z$ and the basic attitude data $\theta_{X0}$, $\theta_{Y0}$, and $\theta_{Z0}$, and determines whether the calculated difference data of the angles are included in angle ranges identified from the mode selection reference data memorized in the reference data memory area (S63). When it is determined at S43 that the data are included, the application program execution management unit 214 performs a cursor movement process (specific process) (S64). More specifically, a process for moving the position of the cursor image displayed on the menu screen to the position of the next mode is performed. On the other hand, when it is determined at S63 that the data are not included, the application program execution management unit 214 determines whether the difference data of the acquired angles $\theta_X$, $\theta_Y$, and $\theta_Z$ are included in angle ranges identified from the selection determining reference data memorized in the reference data memory area (S65). When it is determined at S65 that the data are included, the application program execution management unit 214 performs a process (specific process) for shifting the mode to the mode selected by the cursor on the menu screen (S66). More specifically, when the cursor selects the game mode, the game is started, and when the cursor selects the setting mode, the setting mode is started.

A preferred embodiment of the present invention has been described above, however, various changes can be added to the disclosed embodiment within the scope of the technical matter described in the claims without deviating from the scope and spirit of the present invention.

For example, in the present embodiment, the case where the data of the accelerations $\alpha_X$, $\alpha_Y$, and $\alpha_Z$ and the angles $\theta_X$, $\theta_Y$, and $\theta_Z$ sent from the sensor detection unit 217 are used in an application program that works in an application execution environment created on the phone platform and does not depend on a platform is described, however, the same applies to the application program depending on the platform, that is, the application program directly working on the phone platform.

The present invention is also effectively applicable to, for example, a game in which a virtual ball in the game is dropped in a hole on the game screen displayed on the liquid crystal display 27 as well as games like the above-described flight simulator. In this case, for example, the application program has contents that by tilting the mobile phone 20, the virtual ball moves toward the tilting direction.

In the present embodiment, a process for controlling an airplane in a game and a process for selecting a mode on a menu screen are described by way of example, however, the present invention is also widely applicable to other processes. For example, the present invention is also applicable in the same manner to screen scrolling of a mail browsing screen and a registered data browsing screen for browsing registered phone numbers, etc., of acquaintances.

Also, the present invention is widely applicable to general electronic apparatuses as well as the above-described mobile phone 20, and in this case the same effect can be obtained.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. An electronic apparatus, comprising:
   a display;
   key operation means including keys to be operated by a user;
   detection means for detecting a motion of the electronic apparatus;
   memory means for storing motion identification data for identifying the motion of the electronic apparatus, wherein the motion identification data is stored in response to a predetermined key operation by the user on the key operation means, wherein the motion identification data includes reference data that is determined in response to the predetermined key operation and that identifies a range of motion of the electronic apparatus corresponding to a specific process executed on the electronic apparatus, the range of motion being set using the predetermined key operation, and wherein the reference data is used to control the specific process according to the range of motion that is set using the predetermined key operation, wherein the predetermined key operation is operated at least a first time to start a setting process for setting the range of motion and is operated at least a second time to finish the setting process for setting the range of motion;
   guidance information output means for outputting guidance information for guiding an operation of the electronic apparatus for generating motion of the electronic apparatus corresponding to the specific process after the predetermined key operation;
   storage means for storing detection data on the motion of the electronic apparatus, the motion being detected by the detection means after the predetermined key operation and after the guidance information output means outputs the guidance information; and
   control means for executing the specific process according to the comparison results between the detection data, obtained by detecting the motion of the electronic apparatus with the detection means after storing the motion identification data, and the motion identification data, wherein the specific process includes altering an image displayed on the display according to the comparison results between the detection data and the motion identification data, and
   wherein the display guides operation of the predetermined key operation for the setting process to set the range of motion using the guidance information displayed on the display according to the following:
   (a) the guidance information guides operation of the predetermined key operation to start a setting process for a maximum pitch angle, guides tilting of the electronic apparatus to a pitch angle selected by a user as the maximum pitch angle, and, while the electronic apparatus is at the pitch angle selected as the maximum pitch angle, guides operation of the predetermined key operation again to finish the setting process for the maximum pitch angle;
   (b) the guidance information guides operation of the predetermined key operation to start a setting process for a maximum roll angle, guides tilting of the electronic apparatus to a roll angle selected by a user as the maximum roll angle, and, while the electronic apparatus is at the roll angle selected as the maximum roll angle, guides operation of the predetermined key operation again to finish the setting process for the maximum roll angle; and
   (c) the guidance information guides operation of the predetermined key operation to start a setting process for a maximum yaw angle, guides tilting of the electronic apparatus to a roll angle selected by a user as the maximum yaw angle, and, while the electronic apparatus is at the yaw angle selected as the maximum yaw angle, guides operation of the predetermined key operation again to finish the setting process for the maximum yaw angle.

2. The electronic apparatus according to claim 1, wherein the guidance information output means outputs various guidance information for a plurality of specific processes that the control means can execute;

the storage means performs, for the plurality of specific processes, a process for storing the detection data on the motion of the electronic apparatus detected by the detection means after the predetermined key operation and after the guidance information output means outputs one piece of guidance information or the data obtained by computing the detection data, as motion identification data corresponding to the specific process relating to the one piece of guidance information, in the memory means; and the control means compares the detection data obtained by detecting the motion with detection means or the data obtained by computing the detection data and a plurality of motion identification data stored in the memory means, and executes the specific process corresponding to the motion identification data including the detection data or the data obtained by computing the detection data.

3. The electronic apparatus according to claim 2, wherein acceleration means for detecting acceleration generated in the electronic apparatus is used as the detection means.

4. The electronic apparatus according to claim 3, wherein the acceleration detection means detects a magnitude and direction of the acceleration.

5. The electronic apparatus according to claim 2, wherein attitude change detection means for detecting an attitude change of the electronic apparatus is used as the detection means.

6. The electronic apparatus according to claim 5, wherein rotation detection means for detecting rotation angular displacement or rotation angular velocity and rotation direction generated in the electronic apparatus is used as the attitude change detection means.

7. The electronic apparatus according to claim 1, wherein acceleration means for detecting acceleration generated in the electronic apparatus is used as the detection means.

8. The electronic apparatus according to claim 7, wherein the acceleration detection means detects a magnitude and direction of the acceleration.

9. The electronic apparatus according to claim 1, wherein attitude change detection means for detecting an attitude change of the electronic apparatus is used as the detection means.

10. The electronic apparatus according to claim 9, wherein rotation detection means for detecting rotation angular displacement or rotation angular velocity and rotation direction generated in the electronic apparatus is used as the attitude change detection means.

11. An electronic apparatus, comprising:
a display;
key operation means including keys to be operated by a user;
detection means for detecting an attitude of the electronic apparatus;
basic attitude data memory means for storing basic attitude data for identifying a basic attitude of the electronic apparatus, wherein the basic attitude data is stored in response to a key operation by the user of a specific key of the key operation means, wherein the basic attitude data includes reference data that is determined in response to the key operation and that identifies a range of motion of the electronic apparatus corresponding to a specific process executed on the electronic apparatus, the range of motion being set using the key operation, and wherein the reference data is used to control the specific process according to the range of motion that is set using the key operation, wherein the key operation is operated at least a first time to start a setting process for setting the range of motion and is operated at least a second time to finish the setting process for setting the range of motion;

storage means for storing detection data on the attitude of the electronic apparatus detected by the detection means after storing the basic attitude data; and control means for executing the specific process based on differences between the detection data, obtained by detecting the attitude of the electronic apparatus with the detection means after storing the basic attitude data, and the basic attitude data, wherein the specific process includes altering an image displayed on the display according to the differences between the detection data and the basic attitude data, and wherein the display guides operation of the predetermined operation for the setting process to set the range of motion using guidance information displayed on the display according to the following:

(a) the guidance information guides operation of the key operation to start a setting process for a maximum pitch angle, guides tilting of the electronic apparatus to a pitch angle selected by a user as the maximum pitch angle, and, while the electronic apparatus is at the pitch angle selected as the maximum pitch angle, guides operation of the key operation again to finish the setting process for the maximum pitch angle;

(b) the guidance information guides operation of the key operation to start a setting process for a maximum roll angle, guides tilting of the electronic apparatus to a roll angle selected by a user as the maximum roll angle, and, while the electronic apparatus is at the roll angle selected as the maximum roll angle, guides operation of the key operation again to finish the setting process for the maximum roll angle; and (c) the guidance information guides operation of the key operation to start a setting process for a maximum yaw angle, guides tilting of the electronic apparatus to a roll angle selected by a user as the maximum yaw angle, and, while the electronic apparatus is at the yaw angle selected as the maximum yaw angle, guides operation of the key operation again to finish the setting process for the maximum yaw angle.

12. An electronic apparatus, comprising:
a display;
an interface operation device including an interface to be operated by a user;
a sensor that detects attitude and motion of the electronic apparatus;
a memory that stores reference attitude data from the sensor identifying a reference attitude of the electronic apparatus in response to an operation of a predetermined operation by the user on the interface operation device, wherein the reference attitude data identifies a range of motion of the electronic apparatus corresponding to a specific process executed on the electronic apparatus, the range of motion being set using the predetermined operation, and wherein the reference attitude data is used to control the specific process according to the range of motion that is set using the predetermined operation, wherein the predetermined operation is operated at least a first time to start a setting process for setting the range of motion and is operated at least a second time to finish the setting process for setting the range of motion; and a controller that executes the specific process based on differences between the reference attitude data and detection data obtained after storing the reference attitude data in the memory by detecting, using the sensor, at least one of: an acceleration and a change in attitude of the electronic apparatus, wherein the specific process includes altering an image displayed on the display according to the differences between the reference attitude data and the detection data, and wherein the display guides operation of the predetermined operation for the setting process to set the range of motion using guidance information displayed on the display according to the following:

(a) the guidance information guides operation of the predetermined operation to start a setting process for a maximum pitch angle, guides tilting of the electronic apparatus to a pitch angle selected by a user as the maximum pitch angle, and, while the electronic apparatus is at the pitch angle selected as the maximum pitch angle, guides operation of the predetermined operation again to finish the setting process for the maximum pitch angle;

(b) the guidance information guides operation of the predetermined operation to start a setting process for a maximum roll angle, guides tilting of the electronic apparatus to a roll angle selected by a user as the maximum roll angle, and, while the electronic apparatus is at the roll angle selected as the maximum roll angle, guides operation of the predetermined operation again to finish the setting process for the maximum roll angle; and (c) the guidance information guides operation of the predetermined operation to start a setting process for a maximum yaw angle, guides tilting of the electronic apparatus to a roll angle selected by a user as the maximum yaw angle, and, while the electronic apparatus is at the yaw angle selected as the maximum yaw angle, guides operation of the predetermined operation again to finish the setting process for the maximum yaw angle.

13. The electronic apparatus according to claim 12, wherein the specific process is a process of an application executed on the electronic apparatus.

14. The electronic apparatus according to claim 12, wherein the sensor detects a magnitude and direction of the acceleration of electronic apparatus.

15. The electronic apparatus according to claim 12, wherein sensor detects rotation angular displacement or rotation angular velocity and rotation direction generated in the electronic apparatus.

16. The electronic apparatus according to claim 12, wherein the electronic apparatus is a mobile communication terminal.

17. The electronic apparatus according to claim 12, wherein the electronic apparatus is a gaming machine.

18. A non-transitory computer readable medium storing software for altering an image displayed on an electronic apparatus, the software comprising:

executable code that provides an interface of the electronic apparatus to be operated by a user;

executable code that receives data identifying attitude and motion of the electronic apparatus determined by a sensor;

executable code that stores reference attitude data from the sensor identifying a reference attitude of the electronic apparatus at a time of operation of a predetermined operation on the interface, wherein the reference attitude data identifies a range of motion of the electronic apparatus corresponding to a specific process executed on the electronic apparatus, the range of motion being set using the predetermined operation, and wherein the reference attitude data is used to control the specific process according to the range of motion that is set using the predetermined operation, wherein the predetermined operation is operated at least a first time to start a setting process for setting the range of motion and is operated at least a second time to finish the setting process for setting the range of motion;

executable code that executes the specific process based on differences between the reference attitude data and detection data obtained after storing the reference attitude data in the memory by detecting, using the sensor, at least one of an acceleration and a change in attitude of the electronic apparatus, wherein the specific process includes altering an image displayed on the electronic apparatus according to the differences between the reference attitude data and the detection data; and executable code that displays guidance information for guiding operation of the predetermined operation for the setting process to set the range of motion according to the following:

(a) the guidance information guides operation of the predetermined operation to start a setting process for a maximum pitch angle, guides tilting of the electronic apparatus to a pitch angle selected by a user as the maximum pitch angle, and, while the electronic apparatus is at the pitch angle selected as the maximum pitch angle, guides operation of the predetermined operation again to finish the setting process for the maximum pitch angle;

(b) the guidance information guides operation of the predetermined operation to start a setting process for a maximum roll angle, guides tilting of the electronic apparatus to a roll angle selected by a user as the maximum roll angle, and, while the electronic apparatus is at the roll angle selected as the maximum roll angle, guides operation of the predetermined operation again to finish the setting process for the maximum roll angle; and (c) the guidance information guides operation of the predetermined operation to start a setting process for a maximum yaw angle, guides tilting of the electronic apparatus to a roll angle selected by a user as the maximum yaw angle, and, while the electronic apparatus is at the yaw angle selected as the maximum yaw angle, guides operation of the predetermined operation again to finish the setting process for the maximum yaw angle.

19. The non-transitory computer readable medium according to claim 18, wherein the specific process is a process of an application executed on the electronic apparatus.

20. The non-transitory computer readable medium according to claim 18, wherein the electronic apparatus is at least one of: a mobile communication terminal and a gaming machine.

* * * * *